United States Patent
Shioya

(10) Patent No.: US 7,351,485 B2
(45) Date of Patent: Apr. 1, 2008

(54) POWER SUPPLY WITH POWER GENERATION MODULE AND ELECTRONIC DEVICE

(76) Inventor: Masaharu Shioya, 2276-1, Ninomiya, Akiruno-shi, Tokyo 197-0814 (JP)

( * ) Notice: Subject to any disclaimer, the term of this patent is extended or adjusted under 35 U.S.C. 154(b) by 422 days.

(21) Appl. No.: 10/474,964

(22) PCT Filed: Feb. 21, 2003

(86) PCT No.: PCT/JP03/01929

§ 371 (c)(1),
(2), (4) Date: Oct. 15, 2003

(87) PCT Pub. No.: WO03/073527

PCT Pub. Date: Sep. 4, 2003

(65) Prior Publication Data

US 2004/0131903 A1 Jul. 8, 2004

(30) Foreign Application Priority Data

Feb. 28, 2002 (JP) .............................. 2002-053005
Dec. 18, 2002 (JP) .............................. 2002-366010

(51) Int. Cl.
H01M 8/04 (2006.01)

(52) U.S. Cl. .............................. 429/22; 429/25; 429/34

(58) Field of Classification Search ................. 429/34, 429/38, 22, 25, 19, 17

See application file for complete search history.

(56) References Cited

U.S. PATENT DOCUMENTS

| 4,176,867 | A | * | 12/1979 | Lipschutz | .................... | 292/201 |
| 5,901,869 | A | * | 5/1999 | Ohmura et al. | ............. | 220/210 |
| 6,326,097 | B1 | | 12/2001 | Hockaday | | |
| 2002/0092916 | A1* | | 7/2002 | Gaarder et al. | ........ | 237/12.3 R |
| 2002/0125267 | A1 | | 9/2002 | Gruenwald | | |
| 2003/0042008 | A1* | | 3/2003 | Schulz et al. | .......... | 165/104.12 |
| 2003/0215683 | A1* | | 11/2003 | Bruck et al. | .................. | 429/26 |
| 2005/0136300 | A1* | | 6/2005 | Dyer | .......................... | 429/19 |

FOREIGN PATENT DOCUMENTS

EP 0813264 * 12/1997

(Continued)

OTHER PUBLICATIONS

Patent Abstracts of Japan vol. 2002, No. 2, Apr. 2, 2002 & JP 2001 295996 A (Toyota Motor Corp.).

(Continued)

*Primary Examiner*—Raymond Alejandro

(57) ABSTRACT

A power supply for supplying electric power to a device includes a power generation module. The module includes a power generation portion for generating power by using supplied power generation fuel, a fuel pack accommodating section which can accommodate a plurality of fuel packs capable of storing the power generation fuel, and from which the plurality of fuel packs can be independently removed, and a control portion which performs control such that, while the power generation fuel is supplied from one of the plurality of fuel packs accommodated in the fuel pack accommodating section, the power generation fuel is not supplied from another fuel pack of the plurality of fuel packs.

12 Claims, 15 Drawing Sheets

FOREIGN PATENT DOCUMENTS

| | | |
|---|---|---|
| EP | 0 959 512 A1 | 11/1999 |
| JP | 06-188008 A | 7/1994 |
| JP | 10-249925 A | 9/1998 |
| JP | 2000-268836 A | 9/2000 |
| JP | 2001-093551 A | 4/2001 |
| JP | 2001-295996 * | 10/2001 |
| WO | WO 98/00878 A1 | 1/1998 |

OTHER PUBLICATIONS

Patent Abstracts of Japan vol. 2002, No. 7, Jul. 3, 2002 & JP 2002 081597 A (Toyota Motor Corp.).

Patent Abstracts of Japan vol. 1997, No. 5, & JP 09 019678 A (Tokyo Gas Co., Ltd.).

* cited by examiner

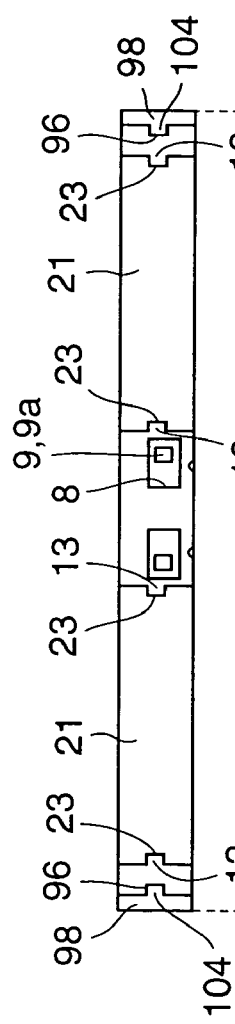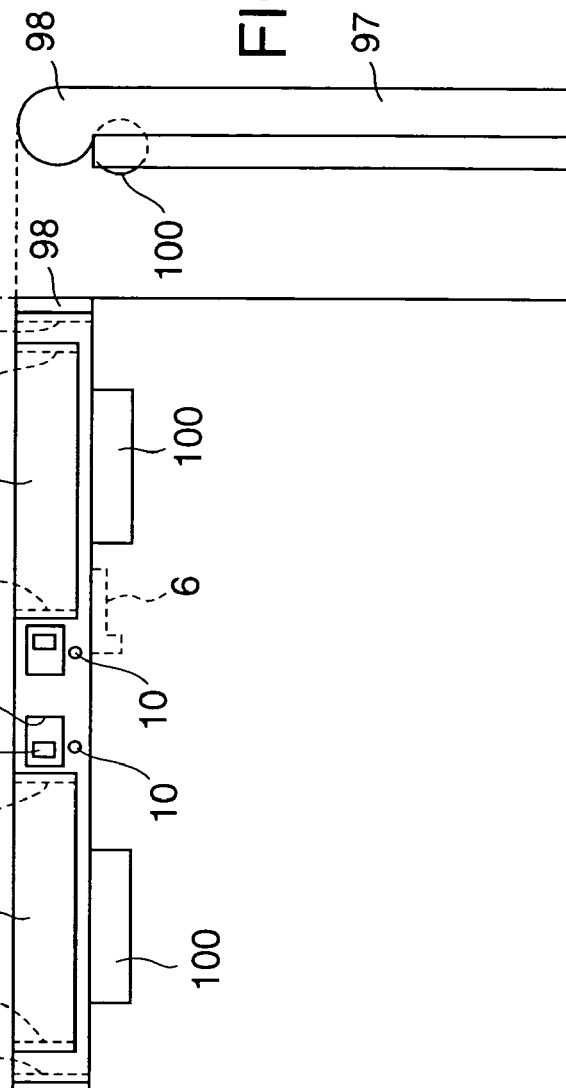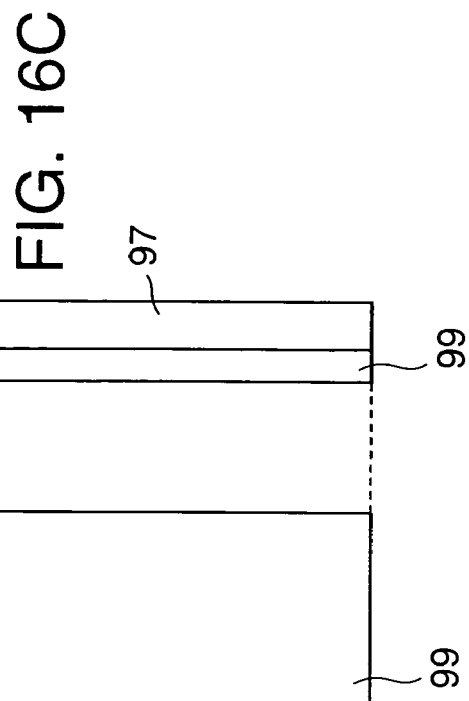

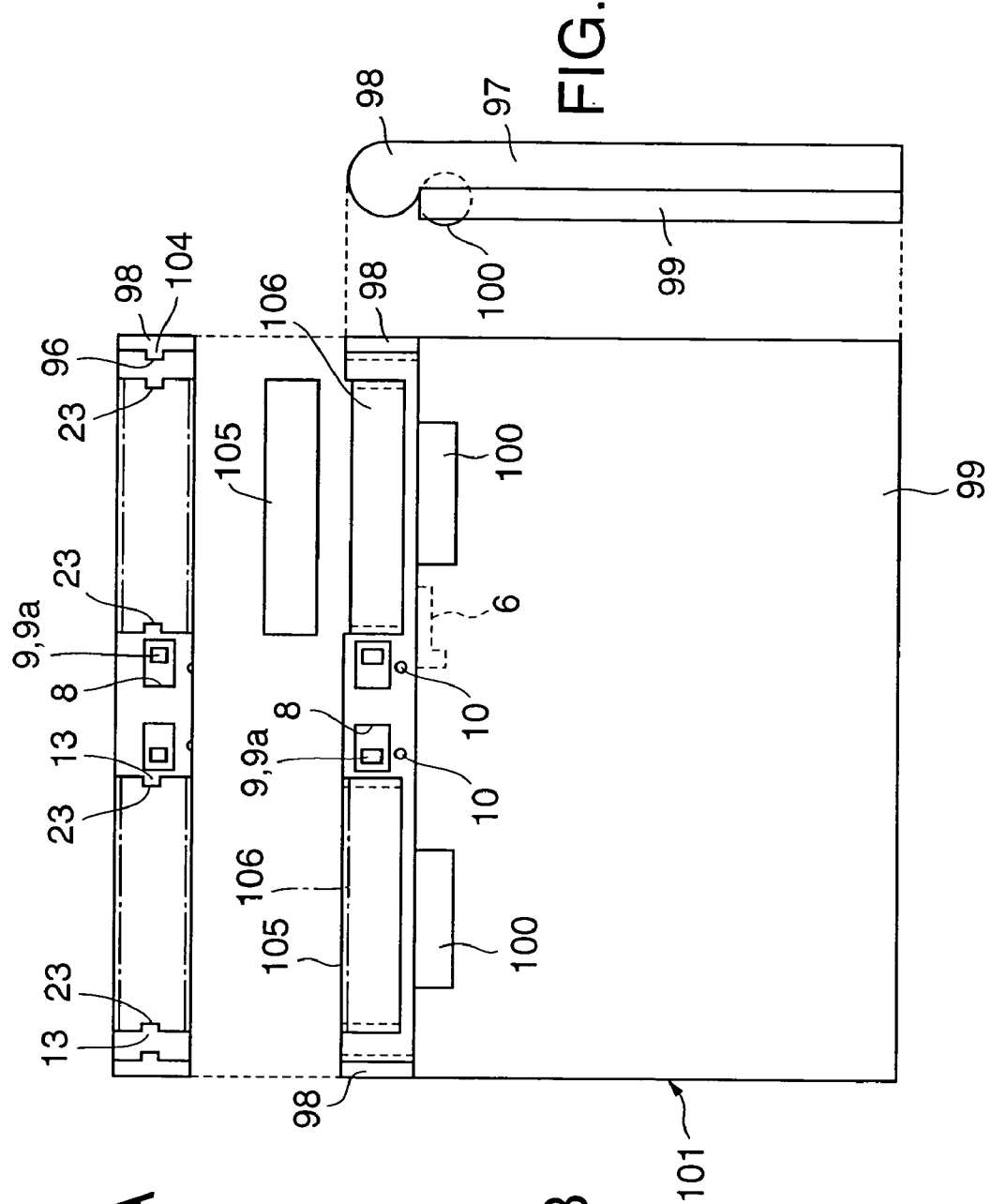

POWER SUPPLY WITH POWER GENERATION MODULE AND ELECTRONIC DEVICE

This application is a U.S. National Phase Application under 35 USC 371 of International Application PCT/JP03/01929 filed Feb. 21, 2003.

CROSS-REFERENCE TO RELATED APPLICATIONS

This application is based upon and claims the benefit of priority from the prior Japanese Patent Applications No. 2002-053005, filed Feb. 28, 2002; and No. 2002-366010, filed Dec. 18, 2002, the entire contents of both which are incorporated herein by reference.

TECHNICAL FIELD

The present invention relates to a power generation type power supply and electronic device.

BACKGROUND ART

Recently, various electronic devices are being increasingly used, and the increase of portable electronic devices is particularly notable. Since these portable electronic devices are driven by internal batteries, one or a plurality of series-connected batteries are contained in the device. The service life of the battery is short regardless of whether the battery is a primary battery or a secondary battery. Therefore, to continuously use the device for long periods, the battery must be replaced during use.

For example, if a battery replacement warning is generated by, e.g., a lamp on a keyboard while a notebook personal computer is in operation, the user must close the application and temporarily terminate operation by turning off the power supply and, after replacing the battery, must reboot the computer by turning on the power supply. That is, a considerable time is necessary for replacement and reboot.

Also, if the battery is a chemical battery regardless of whether it is a primary battery or a secondary battery, the environmental problems concerning disposal of the used chemical battery and the problems of energy use efficiency have been highlighted with the recent growing interest in environmental problems and problems of energy use efficiency.

DISCLOSURE OF INVENTION

It is an advantage of the present invention to provide a power generation type power supply and electronic device by which replacement can be performed while the device is continuously used.

It is another advantage of the present invention to provide a power generation type power supply capable of solving effectively environmental problems, the problems of energy use efficiency, and the like.

According to a first aspect of the present invention, a power generation type power supply for supplying electric power to a device comprises a power generation module having:

a power generation portion which generates power by using supplied power generation fuel;

a fuel pack accommodating portion which accommodates a plurality of fuel packs capable of packing the power generation fuel, and from which the plurality of fuel packs is independently removed; and a control portion which performs control such that, while the power generation fuel is supplied from a first fuel pack of the plurality of-fuel packs accommodated in the fuel pack accommodating portion, the power generation fuel is not supplied from a second fuel pack of the plurality of fuel packs.

In this power generation type power supply, if the amount of power generation fuel in the second fuel pack is smaller than the amount necessary for a power generating operation or if this second fuel pack is to be removed, one fuel pack can be removed or replaced with a new fuel pack containing power generation fuel in an amount necessary for a power generating operation, while the power generation fuel is supplied from the other fuel pack to the power generation module. Accordingly, by selectively replacing a fuel pack in which the power generation fuel is less than the amount necessary for a power generating operation, electric power can be continuously supplied to an external device which uses this power generation module as a power supply. As a consequence, the power generation fuel can be efficiently replaced without causing the device to stop its electrical operation.

According to another aspect, a power generation type power supply comprises a power generation module having:

a fuel pack accommodating portion which accommodates N (N is an integer of 2 or more) fuel packs capable of packing power generation fuel; and a power generation portion which, even when the number of fuel packs accommodated in the fuel pack accommodating portion is 1 or more and (N−1) or less, generates power as the power generation fuel is selectively supplied from the accommodated fuel pack.

According to this aspect, even when the power generation fuel in a certain fuel pack becomes smaller than the amount necessary for power generation and this fuel pack is removed, the power generation portion can continuously generate power by selectively supplying the power generation fuel from at least one of the remaining fuel packs in the fuel pack accommodating portion. This power generation type power supply continuously outputs electric power by replacing a fuel pack containing no fuel. Therefore, a device which operates with electric power from this power supply can be operated without being temporarily electrically stopped.

According to still another aspect, an electronic device comprises:

a power generation module having a power generation portion which generates power by using supplied power generation fuel, and a fuel pack accommodating portion which accommodates N (N is an integer of 2 or more) fuel packs capable of packing the power generation fuel, and from which the fuel packs is independently removed, and, when one (inclusive) to (N−1) (inclusive) fuel packs are accommodated in the fuel pack accommodating portion, capable of receiving the power generation fuel from the fuel pack; and a load which is driven on the basis of the electric power generated by the power generation portion.

According to this aspect, even when fuel packs are not accommodated in all fuel pack accommodating portions, the power generation module can receive power generation fuel from an accommodated fuel pack. Therefore, even if a fuel pack in which the power generation fuel becomes less than the amount necessary for a power generating operation is removed while the load is performing an electrical operation on the basis of the electric power generated by the power generation portion, power generation fuel can be received from a fuel pack containing power generation fuel in an amount equal to or larger than the amount required for a power generating operation, so the electric power can be continuously generated. Consequently, the power generation fuel can be efficiently replaced without temporarily stopping the electrical driving of the load.

In the present invention, even if a charge portion which is charged by electric power generated by a power generation portion in a power generation module or in an electronic device is included, electric charge charged by this charge portion attenuates as an operation progresses. Accordingly, the power generation portion must generate power to charge electric power in an amount required to stably supply electric power at any instant. If the electric power is consumed for long periods, therefore, it is of course necessary to replace power generation fuel. Since this power generation fuel can be replaced while the electronic device is continuously operating as described above, no time-consuming operation such as reboot of the electronic device need be performed. This is particularly effective when the volume of the charge portion must be decreased to make the power generation module compact.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 16A is a side view showing a power generation type portable power supply and a notebook personal computer which is a device into which the power generation type portable power supply is inserted, when they are viewed from the side of the power generation type power supply; FIG. 16B is a front view of the device into which the power generation type portable power supply is inserted, when viewed from the top; and FIG. 16C is a side view of the device into which the power generation type portable power supply is inserted, when viewed from the side;

FIG. 18A is a side view showing another power generation type portable power supply and a notebook personal computer which is a device into which the power generation type portable power supply is inserted, when viewed from the side of the power generation type power supply; FIG. 18B is a plan view of the device into which the power generation type portable power supply is inserted, when viewed from the top; and FIG. 18C is a side view of the device into which the power generation type portable power supply is inserted, when viewed from the side.

BEST MODE FOR CARRYING OUT THE INVENTION

Figure 1:
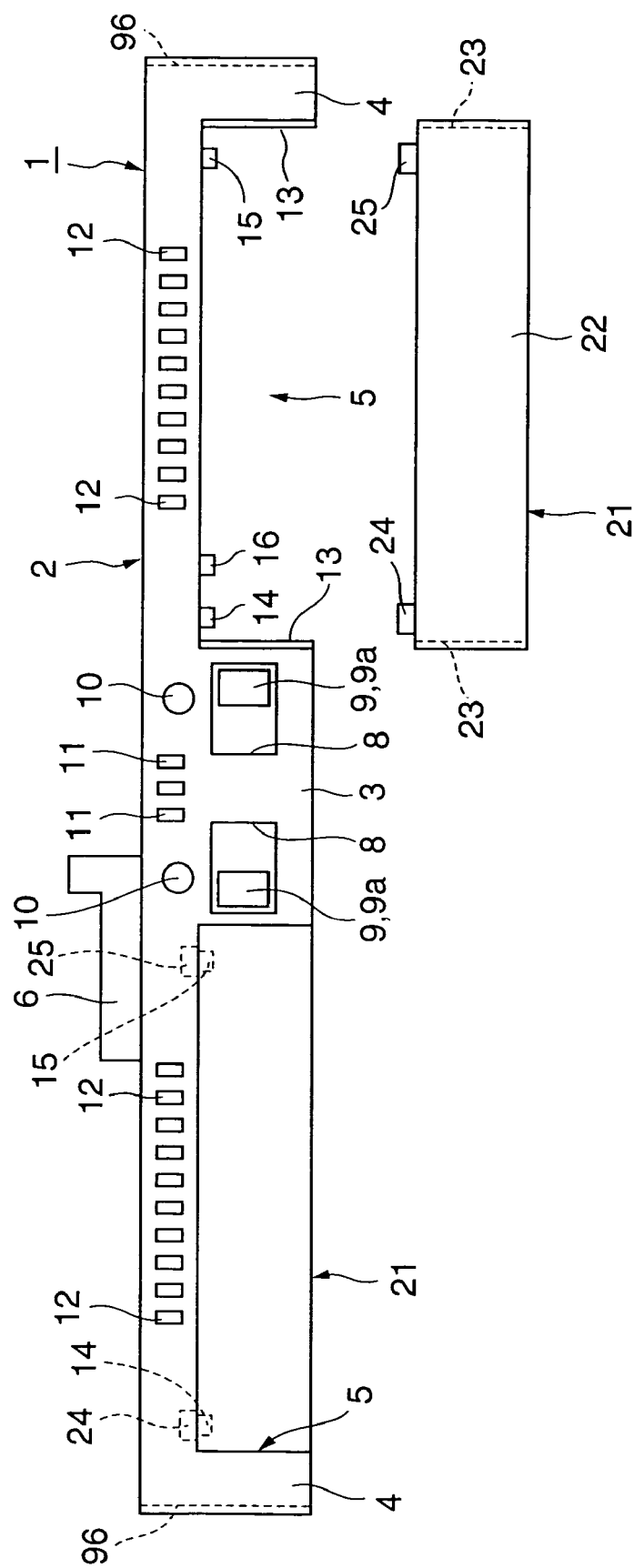
FIG. 1 is a plan view showing the state in which one fuel pack of a power generation type portable power supply as an embodiment of the present invention is removed.
Figure 2:
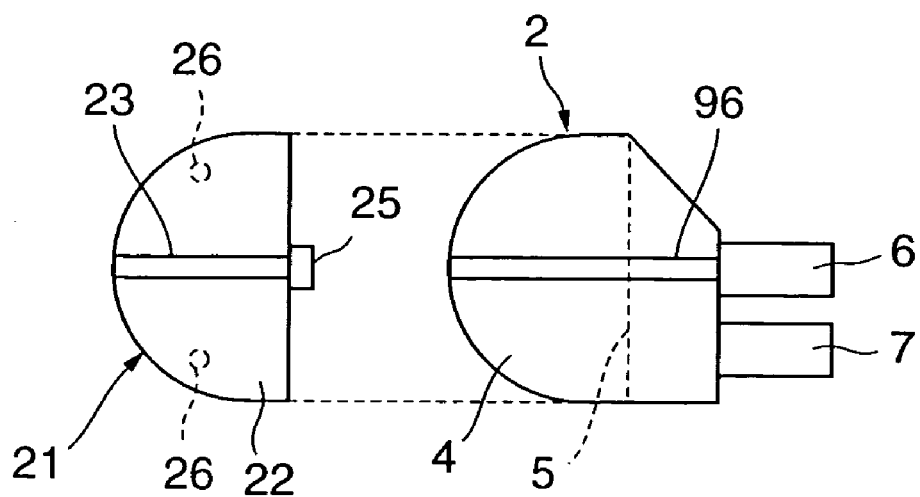
FIG. 2 is a right side view of the power generation type portable power supply shown in FIG. 1.

FIG. 1 is a plan view showing the state in which one fuel pack of a power generation type portable power supply as an embodiment of the present invention is removed. FIG. 2 is a right side view of FIG. 1. In this power generation type portable power supply, two fuel packs 21 can be detachably attached to one power generation module 1.

Although details will be explained later, the power generation module 1 is a power supply for supplying electric power to an external device, and includes a fuel reforming type solid polymer electrolyte fuel cell. This power generation module 1 generates power by using power generation fuel (e.g., at least one of a hydrogen-containing liquid fuel, liquefied fuel, and gaseous fuel, which contains water) supplied from one of the fuel packs 21. If no power generation fuel in a sufficient amount necessary to generate power remains any longer in this fuel pack 21, supply of the power generation fuel is automatically switched from this fuel pack 21 to the other fuel pack 21.

The power generation module 1 has a resin or metal case 2. This case 2 is thin and long when viewed from above as shown in FIG. 1, and has a semicircular shape when viewed sideways as shown in FIG. 2. That is, the case 2 has a flat rear surface, substantially semicircular surfaces (defining the upper surface and side surfaces), and a flat lower surface. The case 2 also has a central projecting portion 3 which is formed in a central portion and projects forward, and end projecting portions 4 which are formed in two end portions and project forward. Fuel pack accommodating portions 5 of an accommodating section are formed between these projecting portions 3, 4. A positive electrode terminal 6 and negative electrode terminal 7 to be connected to a connector (not shown) of a portable device such as a notebook personal computer are formed in a predetermined portion on the rear side of this case 2.

Rectangular openings 8 are formed away from each other on the left- and right-hand sides in the upper surface of the central projecting portion 3. In each opening, an operating projection 9a of a fuel pack locking slider 9 which can move from side to side is placed. A remaining fuel amount indicating lamp 10 is formed near each opening 8 in the upper surface behind the central projecting portion 3. Details of the fuel pack locking slider 9 and remaining fuel amount indicating lamp 10 will be described later.

Between the two remaining fuel amount indicating lamps 10, a plurality of slits 11 are formed in the upper surface of the case 2. These slits 11 take in air necessary to oxidize toxic carbon monoxide, which is one byproduct produced during the course of fuel reforming, into carbon dioxide. Between the central projecting portion 3 and each of the end projecting portions 4, a plurality of slits 12 for taking in air necessary for power generation (to be described later) are formed in predetermined portions in the upper surface of the case 2.

The external arrangement of the fuel pack 21 will be explained next. This fuel pack 21 has a flat rear surface and semi-circular side surfaces (defining the upper surface, front surface, and lower surface).

The fuel pack 21 includes a hollow, substantially semi-cylindrical case 22 made of a transparent polymer resin. In the center of each of the two end faces of this case 22, a guide groove 23 extending forward and backward is formed. On the flat back surface of the case 22, a fuel supply valve 24 and byproduct collecting valve 25 are formed near the two end portions. As shown in FIG. 2, two engaging holes 26 are formed away from each other in the vertical direction in each end face of each fuel pack 21 shown in FIG. 1. The internal arrangement of the fuel pack 21 will be described later.

On the opposing surfaces of the central projecting portion 3 and end projecting portion 4 which define each fuel pack accommodating portion 5 between them, linear guide projections 13 extending forward and backward are formed to respectively fit in the guide grooves of the fuel pack 21. On the flat front surface of a portion (to be referred to as a case base portion hereinafter) of the case 2 between the central projecting portion 3 and each end projecting portion 4, a fuel supply port 14 and byproduct collecting port 15 are so formed as to fit in and communicate with the fuel supply valve 24 and byproduct collecting valve 25, respectively, of each fuel pack 21.

In this embodiment, the two fuel packs 21 have the same structure. In each of the two fuel pack accommodating portions 5 of the case 2, the fuel supply port 14 and byproduct collecting port 15 are positioned on the left- and right-hand sides, respectively, of the case base portion. Accordingly, each fuel pack 21 can be accommodated in either of the left and right fuel pack accommodating portions 5. The fuel supply port 14 and byproduct collecting port 15 have different fitting shapes or configurations, and the fitting shapes of the fuel supply valve 24 and byproduct collecting valve 25 are also different. Therefore, the fuel supply valve 24 cannot be fitted on the byproduct collecting port 15 even by mistake, and the byproduct collecting valve 25 cannot be fitted on the fuel supply port 14 even by mistake. That is, the fuel packs 21 are of the same type, and the fuel supply ports 14 and byproduct collecting ports 15 of the two fuel pack accommodating portions 5 have the same positional relationship. Hence, the user need not remember different ways of accommodation for the left and right fuel pack accommodating portions 5, and cannot set the fuel pack 21 upside down by mistake. Near the fuel supply port 14 on the front surface of each case portion, a switch 16 for detecting that the fuel pack 21 is accommodated in the fuel pack accommodating portion 5 is formed.

Figure 3:
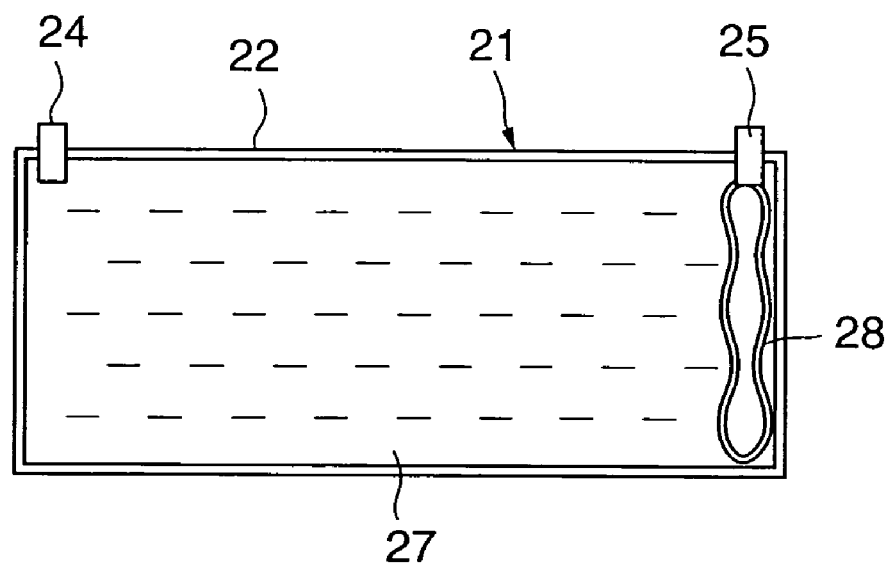
FIG. 3 is a cross-sectional view of the fuel pack.

FIG. 3 is a cross-sectional plan view of the fuel pack 21. For example, power generation fuel (to be simply referred to as fuel hereinafter) made of an aqueous methanol solution is packed in the case 22. This portion in which the fuel is packed will be called a fuel pack portion 27 hereinafter. In the case 22, a byproduct collecting portion 28 made of a transparent, flexible polymer resin and connected to the inside of the byproduct collecting valve 25 is formed. Although not shown, a certain amount of, e.g., a red dye is packed in this byproduct collecting portion 28. Although details will be explained later, the case 22 and byproduct collecting portion 28 are made transparent in order to enable external optical detection of the remaining amount of the fuel in the fuel pack portion 27.

Figure 4:
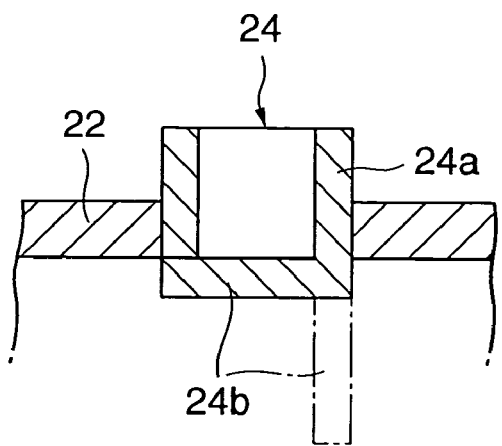
FIG. 4 is a sectional view of a fuel supply valve of the fuel pack.

The fuel supply valve 24 is a check valve. As shown in FIG. 4 as an example, this fuel supply valve 24 has a structure in which a plate valve 24b which can elastically deform, as indicated by one-dot dashed lines, is formed inside a cylindrical member 24a. When the fuel pack 21 is not accommodated in the fuel pack accommodating portion 5 of the power generation module 1, this fuel supply valve 24 is in a closed state in which the opening of the cylindrical member 24a is closed with the plate valve 24b by the elastic returning force of this plate valve 24b itself and by the internal pressure, which is higher than the atmospheric pressure, of the fuel packed in the case 22. Although the shape is different, the byproduct collecting valve 25 has the same checking function as the fuel supply valve 24 and has a pipe member and plate valve.

Figure 5:
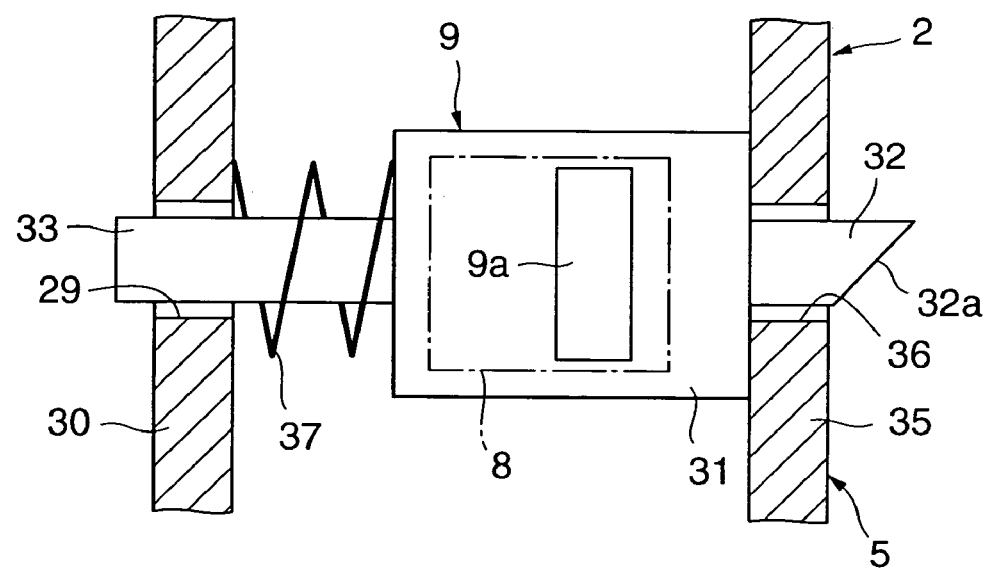
FIG. 5 is a partially sectional view of a fuel pack locking slider.
Figure 6:
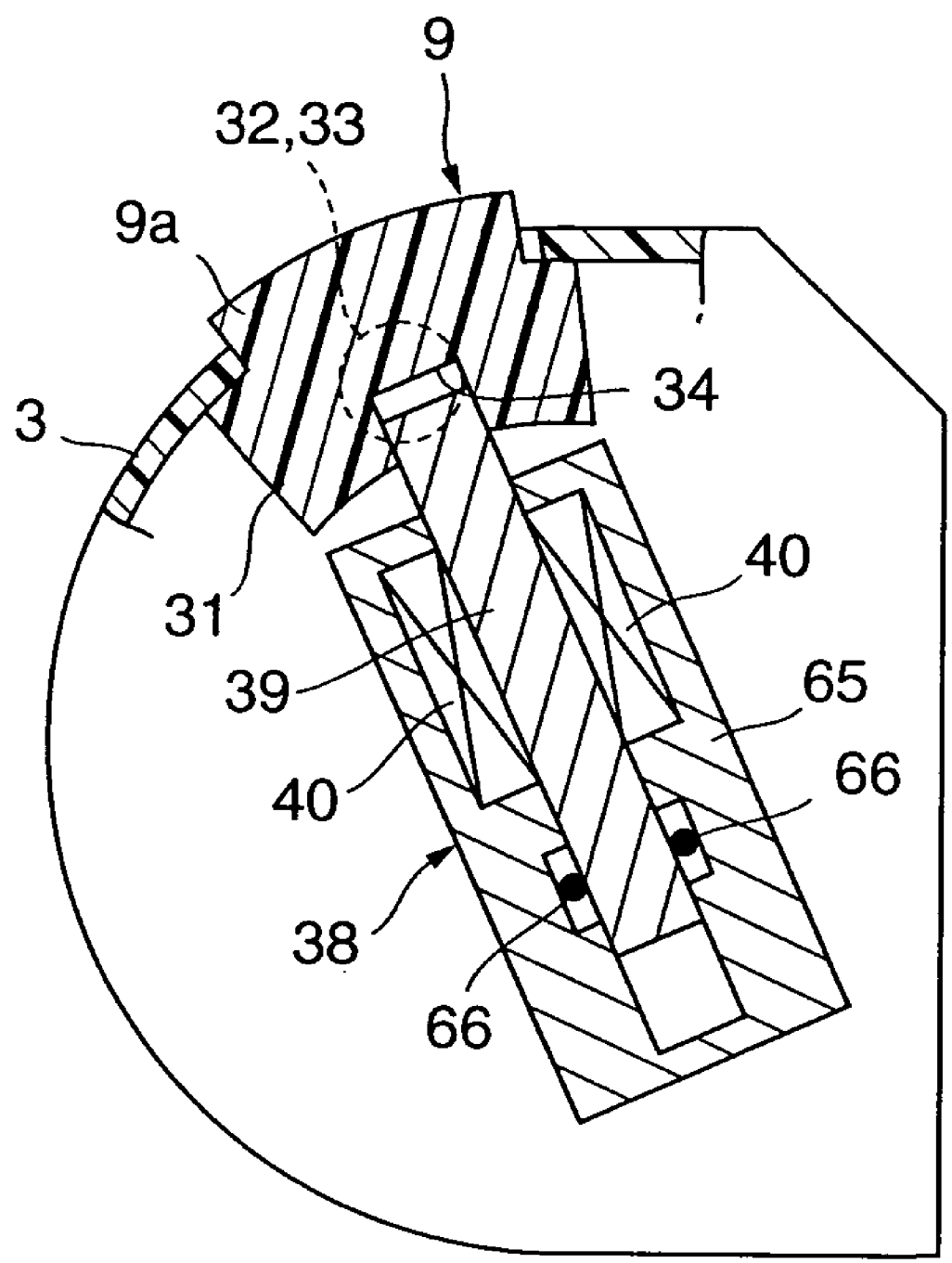
FIG. 6 is a longitudinal sectional right side view of the fuel pack locking slider.

FIG. 5 is a partially sectional plan view of a portion of the fuel pack locking slider 9 on the right-hand side shown in FIG. 1 when the fuel pack 21 accommodated in the fuel pack accommodating portion 5 of the power generation module 1 is automatically locked so as not to be removed from the power generation module 1 by mistake. FIG. 6 is a longitudinal sectional view of the same portion when the fuel pack 21 is automatically locked. The fuel pack locking slider 9 has on top of it the operating projection 9a which is exposed from the upper surface of the central projecting portion 3, and has a slider main-body 31 provided inside this central projecting portion 3. That side surface of the slider main body 31, which faces a support wall 35 as one side portion of the fuel pack accommodating portion 5 has an engaging projection 32 having an inclined end face 32a as its front end face. The other side surface of this slider main body 31 has a projected shaft 33. The extended end portion of the shaft 33 is inserted into a through hole 29 of a shaft support portion 30 formed in the central projecting portion 3 so as to be movable from side to side (in the longitudinal direction of the case 2).

In a normal state, the fuel pack locking slider 9 is biased to the right by the biasing force of a compressed coil spring 37 wound around the shaft 33 between the slider main body 31 and the shaft support portion 30 on the left-hand side. Thus, the slider main body 31 is positioned in contact with the inner surface of the support wall 35 (FIG. 5). In this state, the inclined end face 32a of the engaging projection 32 projects into the fuel pack accommodating portion 5 from the outer surface of the support wall 35. When the end portion of this engaging projection 32 is caught by one of the engaging holes 26 (FIG. 2) of the fuel pack 21, the fuel pack 21 is locked or fixed to the fuel pack accommodating portion 5 of the power generation module 1.

An engaging hole 34 is formed in the lower surface of the slider main body 31, and an electromagnetic solenoid 38 is positioned below this lower surface as shown in FIG. 6. This electromagnetic solenoid 38 includes a cylindrical rod 39, plunger 40, and support portion 65. The plunger 40 is so formed as to cover a central portion of the rod 39, and contains a permanent magnet and electromagnetic force coil. The support portion 65 supports the plunger 40 and allows the rod 39 to move smoothly in the longitudinal direction via a linear ball bearing 66. The electromagnetic solenoid 38 operates as follows. A control portion or controller 55 (FIG. 8) which is formed in the power generation module 1 and which senses an auto-lock state, as will be described later, controls the electromagnetic force coil in the plunger 40, thereby moving that distal end portion of the rod 39 of the electromagnetic solenoid 38, which is formed in a predetermined portion in the case 2, in a direction perpendicular to the sliding direction of the engaging projection 32. This distal end portion is inserted into the engaging hole 34 of the fuel pack locking slider 9 to fix it such that the fuel pack locking slider 9 does not slide. However, if the fuel pack 21 is not accommodated in the fuel pack accommodating portion 5, the control portion 55 in the power generation module 1 senses this state. So, the distal end portion of the rod 39 of the electromagnetic solenoid 38 disengages from the engaging hole 34 of the fuel pack locking slider 9 to allow this fuel pack locking slider 9 to slide freely.

As an example, a case in which the right fuel pack 21 is to be accommodated in the right fuel pack accommodating portion 5 of the power generation module 1 will be explained below. In the initial state in which the fuel pack 21 is not accommodated in the fuel pack accommodating portion 5, i.e., in the state in which the switch 16 is not pressed by the pack 21, the distal end portion of the rod 39 of the electromagnetic solenoid 38 has been moved outside the engaging hole 34 of the fuel pack locking slider 9 by the controller 55. Therefore, the fuel pack locking slider 9 can slide freely. When after that the fuel pack 21 is moved backward so as to be accommodated in the fuel pack accommodating portion 5 by guiding the guide grooves 23 along the corresponding guide projections 13, the inclined distal end face 32a of the engaging projection 32 of the fuel pack locking slider 9 is pushed by the left side surface of the fuel pack 21 and moved to the left against the force of the coil spring 37, thereby permitting the fuel pack 21 to be received in the fuel pack accommodating portion 5.

When the fuel pack 21 is completely loaded in the fuel pack accommodating portion 5, the fuel pack locking slider 9 is biased to the right by the compressed spring 37, and the distal end defined by the inclined distal end face 32a of the engaging projection 32 is inserted into a predetermined one of the engaging holes 26 of the fuel pack 21. In this state, therefore, the fuel pack 21 is locked to the accommodating position in the fuel pack accommodating portion 5.

When the fuel pack 21 is thus loaded in the fuel pack accommodating portion 5, the switch 16 is pushed and turned on by the front face of the pack 21. The control portion 55 senses this state and inserts the rod 39 of the electromagnetic solenoid 38 into the engaging hole 34 of the fuel pack locking slider 9. Accordingly, the engaging projection 32 of the slider 9 on the side on which the fuel pack 21 is accommodated extends through the hole 36 and engages with one engaging hole 26 of the fuel pack 21. In this way, the slider 9 is locked so as not to slide while the fuel pack 21 is kept fixed to the fuel pack accommodating portion 5 of the power generation module 1.

The auto-lock control described above is an explanation pertaining to the right fuel pack accommodating portion 5. However, the left fuel pack accommodating portion 5 of the power generation module 1 naturally includes a mechanism which achieves the same function and operation. Also, the fuel pack locking slider 9, the operating projection 9a, and the related peripheral locking mechanism structure on the left-hand side are mirror images of those on the right-hand side shown in FIG. 5.

As described above, the fuel pack locking slider 9 and fuel pack 21 are locked by the electromagnetic solenoid 38 in order to prevent removal of the fuel pack 21 by mistake during a power generating operation, i.e., while at least one of a fuel vapor portion 44, fuel reforming portion 45, CO elimination portion 46, and power generation portion 50 (these portions will be described later with reference to FIG. 8) is in operation, or while power generation fuel is supplied from the fuel pack 21 to the power generation module 1, thereby preventing an accident in which the power generating operation is abnormally stopped.

Figures 7A, 7B:
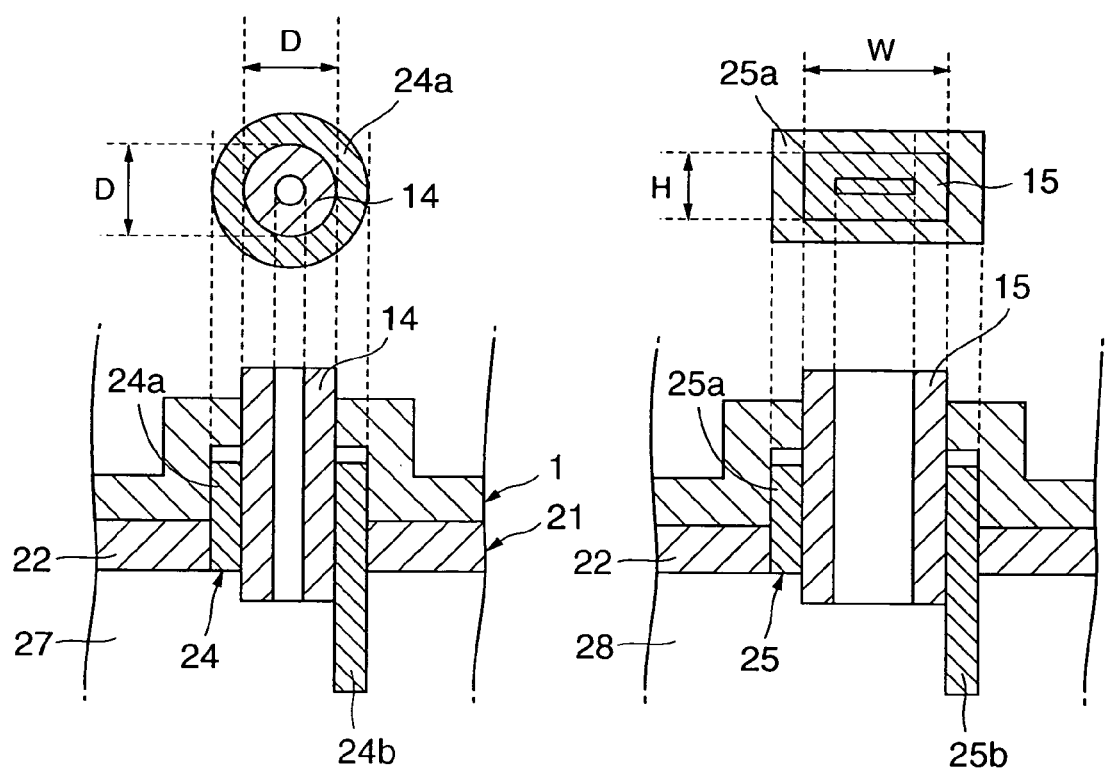
FIGS. 7A and 7B are cross-sectional views each showing a portion of the state in which the fuel pack is accommodated in a fuel pack accommodating portion.

FIG. 7A is a schematic sectional view when the cylindrical fuel support port 14 is inserted into the cylindrical member 24a of the fuel supply valve 24 when the fuel pack 21 is accommodated in the fuel pack accommodating portion 5. FIG. 7B is a schematic sectional view when the pipe-like byproduct collecting port 15 having a rectangular outer shape in its longitudinal section is inserted into a pipe member 25a having a rectangular inner shape in its longitudinal section of the byproduct collecting valve 25 when the fuel pack 21 is accommodated in the fuel pack accommodating portion 5. In this case, the plate valve 24b of the fuel supply valve 24 is pressed by the distal end portion of the fuel supply port 14 and elastically deforms, and this allows the fuel supply port 14 to communicate with the fuel pack portion 27. Likewise, a plate valve 25b of the byproduct collecting valve 25 is pressed by the distal end portion of the byproduct collecting port 15 and elastically deforms, allowing the byproduct collecting port 15 to communicate with the byproduct collecting portion 28.

As described above, the longitudinal sectional shape of the flow path in the cylindrical member 24a differs from the longitudinal sectional shape of the byproduct collecting port 15, and the longitudinal sectional shape of the flow path in the pipe member 25a differs from the longitudinal sectional shape of the fuel supply port 14. In addition, an outer diameter D of the fuel supply port 14 is larger than a height H of the rectangular flow path of the pipe member 25a, so the fuel supply port 14 cannot be inserted into the pipe member 25a. Also, a width W of the rectangular byproduct collecting port 15 is larger than an inner diameter (port outside diameter) D of the cylindrical member 24a, so the byproduct collecting port 15 cannot be inserted into the cylindrical member 24a. Accordingly, the fuel supply valve 24 and byproduct collecting valve 25 of the fuel pack 21 cannot be fitted on the byproduct collecting port 15 and fuel supply port 14, respectively, by mistake.

The remaining fuel amount indicating lamp 10 will be explained below. The indicating lamp 10 corresponds to the fuel pack 21 accommodated in the right fuel pack accommodating portion 5. The left remaining fuel amount indicating lamp 10 corresponds to the fuel pack 21 accommodated in the left fuel pack accommodating portion 5.

Each remaining fuel amount indicating lamp 10 is off when the fuel pack 21 is not loaded in the fuel pack accommodating portion 5, i.e., when the switch 16 is not pushed against the fuel pack 21. The indicating lamp 10 emits green light when the remaining amount of fuel in the fuel pack portion 27 of the fuel pack 21 loaded in the fuel pack accommodating portion 5 is sufficient for power generation, and emits red light when the remaining amount of fuel in the fuel pack portion 27 of the fuel pack 21 accommodated in the fuel pack accommodating portion 5 is insufficient for power generation. This remaining fuel amount data can also be output to a device 101 (FIG. 8) to be described later. When this is the case, the power generation module 1 is equipped with a terminal for outputting the remaining fuel amount data to the device 101, in addition to the positive electrode terminal 6 and negative electrode terminal 7, and the device 101 is equipped with an indicator for indicating the remaining amount of each fuel pack 21. This allows the operator operating the device 101 to recognize the replacement time of the fuel pack 21 without checking the remaining fuel amount indicating lamp 10 of the power generation module 1. The remaining amount data can be binary data indicating whether the remaining amount of fuel in the fuel pack portion 27 of the fuel pack 21 is sufficient for power generation. This remaining amount data can also be classified into multiple stages of, e.g., 75% or more, 50% (inclusive) to 75% (exclusive), equal to or larger than the amount necessary for power generation and less than 50%, and less than an amount necessary for power generation. The device 101 finely indicates the remaining amount in accordance with this data. This permits the operator to operate the device 101 while easily predicting the replacement time of the fuel pack 21. Detection of the remaining amount of fuel in the fuel pack portion 27 of the fuel pack 21 accommodated in the fuel pack accommodating portion 5 will be described later.

Figure 8:
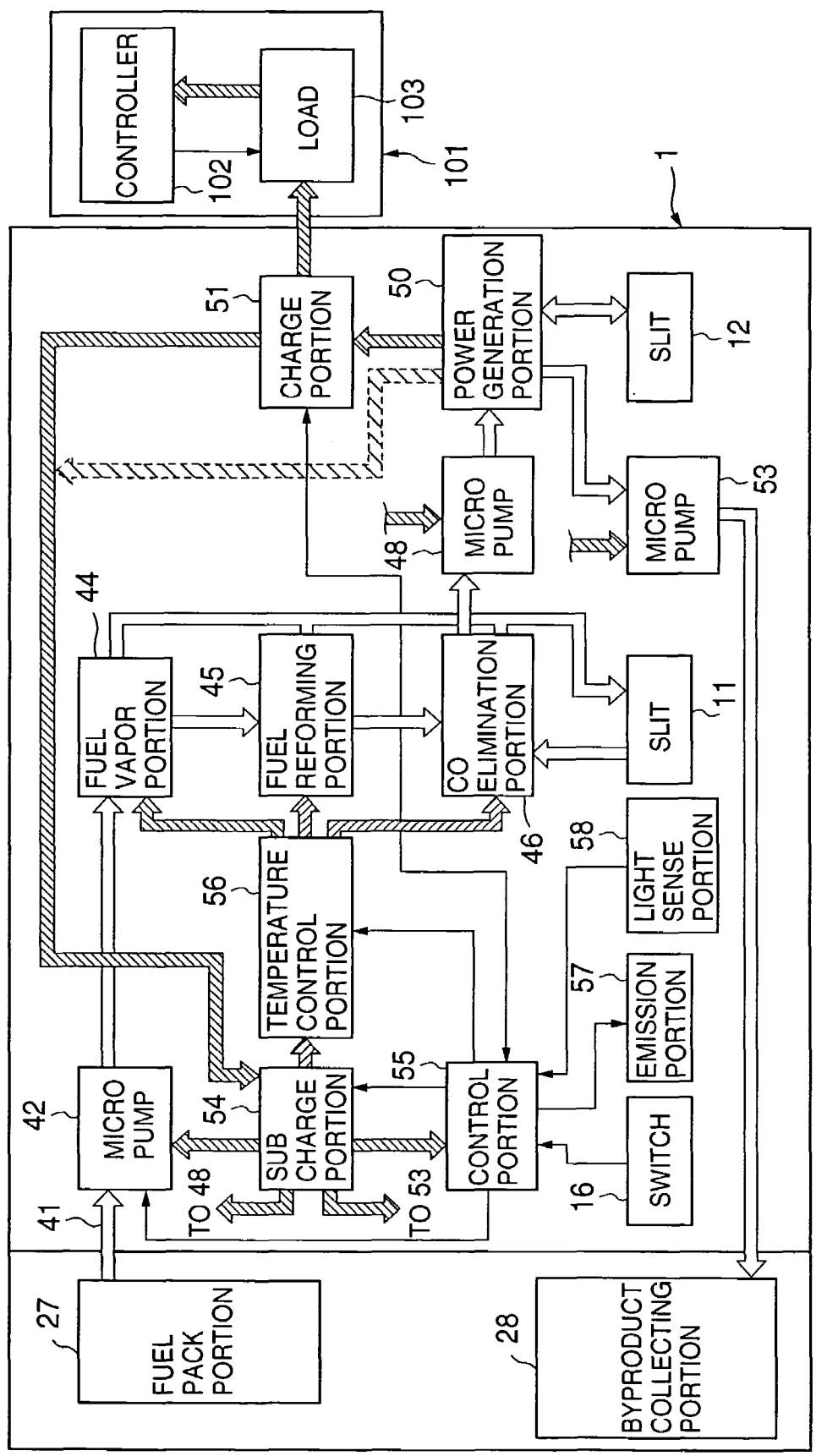
FIG. 8 is a block diagram showing parts of a power generation module and the fuel pack and main components of a device driven by the power generation module.

FIG. 8 is a block diagram showing the main parts of the power generation module 1 and fuel pack 21 and the main components of the device 101 such as a notebook personal computer driven by the power generation module 1. FIG. 8 shows only one of each pair of components, such as the fuel packs 21. The following explanation will be made with reference to the accompanying drawing including FIG. 8. Note that the device 101 includes a controller 102 and a load 103 controlled by this controller 102.

Figure 9:
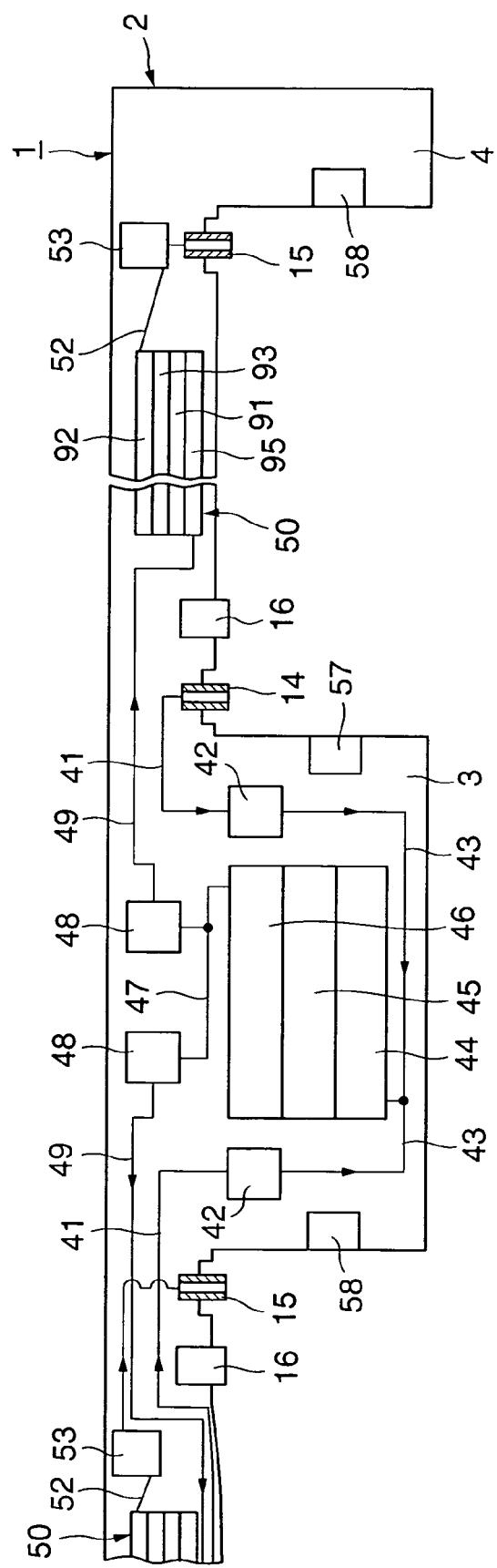
FIG. 9 is a plan view showing an outline of the internal arrangement of a case of the power generation module.

FIG. 9 is a plan view showing an outline of the inner arrangement of the case 2 of the power generation module 1. First, a central portion and its vicinity of the case 2 will be explained below. Each fuel supply port 14 is connected to the inflow side of a micro pump (fuel flow controller) 42 via a flow path 41. The outflow side of this micro pump 42 is connected to the fuel vapor portion 44 through a flow path 43. The fuel vapor portion 44 heats and vaporizes fuel made of an aqueous ethanol solution, which is supplied from the fuel pack 21, by using a thin film heater 63 (to be described later) under the control of the control portion 55.

The outflow side of the fuel vapor portion 44 is connected to the inflow side of the fuel reforming portion 45. This fuel reforming portion 45 is a small reactor called a micro chemical reactor. The fuel reforming portion 45 reforms the vaporized fuel supplied from the fuel vapor portion 44 to produce hydrogen, carbon dioxide as a byproduct, and a slight amount of carbon monoxide. The fuel reforming portion 45 separates and discharges the carbon dioxide to the atmosphere through the slits 11 formed in the case. A practical structure will be described later. It is also possible, where necessary, to receive water supplied from the micro pump 42 and/or power generation portion 50 (to be described later) through a flow path (not shown), cause carbon monoxide to react with this water to produce hydrogen and carbon dioxide as a byproduct, and separate and discharge the carbon dioxide to the atmosphere through the slits 11. A practical structure will be explained later.

The outflow side of the fuel reforming portion 45 is connected to the inflow side of the CO (carbon monoxide) elimination portion 46. This CO elimination portion 46 is a micro chemical reactor. The reactor 46 causes carbon monoxide contained in hydrogen supplied from the fuel reforming portion 45 to react with oxygen supplied through the slits 11 to produce carbon dioxide, separates this carbon dioxide from hydrogen, and discharges the carbon dioxide to the atmosphere through the slits 11. A practical structure will be explained later.

The outflow side of the CO elimination portion 46 is connected to the inflow sides of two micro pumps 48 through a flow path 47. The outflow side of each micro pump 48 is connected to the inflow side of the power generation portion 50 through a flow path 49. The power generation portion 50 is formed inside the case 2 in the fuel pack accommodating portion 5. This portion 50 receives hydrogen supplied from the CO elimination portion 46 and generates power by using this hydrogen and oxygen supplied through the slits 12. The power generation portion 50 supplies the generated electric power to a charge portion 51 (FIG. 8) and discharges the produced water to a flow path 52. A practical structure will be described later.

Referring to FIG. 9, the flow path 52 is an inclined channel running down to a micro pump 53. The lower end of this flow path 52 is connected to the inflow side of the micro pump 53. The outflow side of this micro pump 53 is connected to the byproduct collecting port 15 described above. Accordingly, with the fuel pack 21 loaded in the fuel pack accommodating portion 5, the outflow side of the micro pump 53 is connected to the byproduct collecting portion 28 via the byproduct collecting port 15 and byproduct collecting valve 25. When the switch 16 of the right fuel pack accommodating portion 5 is not pressed, i.e., when the fuel pack 21 is not loaded in this right fuel. pack accommodating portion 5, the control portion 55 stops the operations of the micro pumps 42, 48, and 53 on the right-hand side. When the switch 16 of the left fuel pack accommodating portion 5 is not pressed, i.e., when the fuel pack 21 is not loaded in this left fuel pack accommodating portion 5, the control portion 55 stops the operations of the micro pumps 42, 48, and 53 on the left-hand side.

Although not shown in FIG. 9, the charge portion 51 (FIG. 8) is formed inside the central portion of the case 2. This charge portion 51 has a capacitor or the like which is charged by receiving the supply of generated power from the power generation portion 50. The charge portion 51 supplies the charged electric power to a sub charge portion 54, the load 103 of the device 101, and the controller 102.

Although not shown in FIG. 9, the sub charge portion 54 shown in FIG. 8 is provided inside the central portion of the case 2. This sub charge portion 54 has a capacitor or the like which is charged by receiving the supply of power from the main charge portion 51 or power generation portion 50. The sub charger 54 outputs necessary electric power to the micro pumps 42, 48, and 53, the control portion 55, a temperature control portion 56, an emission portion 57, and the remaining fuel amount indicating lamp 10.

Although not shown in FIG. 9, the control portion 55 is provided inside the central portion of the case 2. This control portion 55 controls all driving operations in the power generation module 1. Although not shown in FIG. 9, the temperature control portion 56 is provided inside the central portion of the case 2. This temperature control portion 56 controls the temperatures of the fuel vapor portion 44, fuel reforming portion 45, and CO elimination portion 46, and, in some cases, controls the temperature of the power generation portion 50.

The emission portions 57 are provided in that portion of the left end projecting portion 4 and in that portion on the right-hand side of the central projecting portion 3 of the case 2 which are exposed to the fuel pack accommodating portions 5. Light sense portions 58 are provided in that portion on the left-hand side of the central projecting portion 3 and in that portion of the right end projecting portion 4 which are exposed to the fuel pack accommodating portions 5, where these light sense portions 58 oppose the emission portions 57. As will be described later, the emission portion 57 and light sense portion 58 optically sense, from outside the fuel pack 21, the remaining amount of fuel in the fuel pack portion 27 of the fuel pack 21 accommodated in the fuel pack accommodating portion 5.

The power generating operation of this power generation type portable power supply will be described below. Assume, as described above, that the fuel packs 21 are loaded in the two fuel pack accommodating portions 5 of the power generation module 1 and locked by the fuel pack locking sliders 9, and that each fuel pack locking slider 9 is locked by the corresponding electromagnetic solenoid 38. The switches 16 are pushed and turned on by the fuel packs 21.

When these switches 16 are turned on, the control portion 55 determines that the fuel packs 21 are accommodated in the fuel pack accommodating portions 5. Also, the control portion 55 receives sense signals from the emission portions 57 and light sense portions 58, and checks which of the two fuel packs 21 has a smaller remaining fuel amount. In order to supply fuel only from a fuel pack 21 found to have a remaining fuel amount which is smaller and still sufficient for power generation, the control portion 55 outputs a command signal for supplying driving power to the micro pump 42 communicating with this fuel pack 21 having a smaller amount of fuel, and supplying no driving power to the micro pump 42 communicating with a fuel pack 21 having a larger amount of fuel, so as to drive the micro pump 42 communicating with the fuel pack 21 having a smaller amount of fuel.

Figure 10:
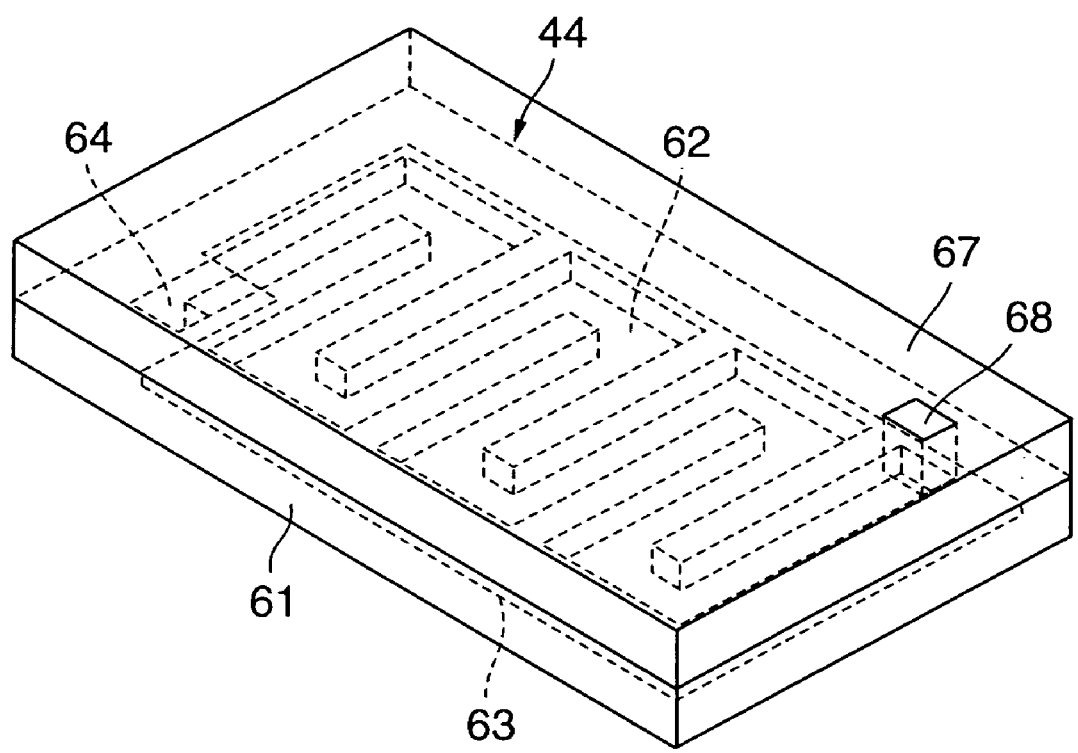
FIG. 10 is a perspective view of part of a fuel vapor portion.

Consequently, this micro pump 42 communicating with the fuel pack 21 having a smaller amount of fuel is driven to supply to the fuel vapor portion 44 an aqueous methanol solution contained in the fuel pack portion 27 of the fuel pack 21 having a smaller amount of fuel. A practical structure of the fuel vapor portion 44 will be explained below with reference to FIG. 10. This fuel vapor portion 44 has a structure in which a zigzagged flow path 62 is formed in one surface of a substrate 61 made of, e.g., silicon, glass, or an aluminum alloy, a thin film heater 63 and heater wiring (not shown) are formed on the other surface of the substrate 61, and the flow path 62 in the surface of the substrate 61 is covered with a glass plate 67. An inlet 64 is formed in that portion of the substrate 61, which corresponds to one end portion of the flow path 62. An outlet 68 is formed in that portion of the glass plate 67, which corresponds to the other end portion of the flow path 62.

Figure 11:
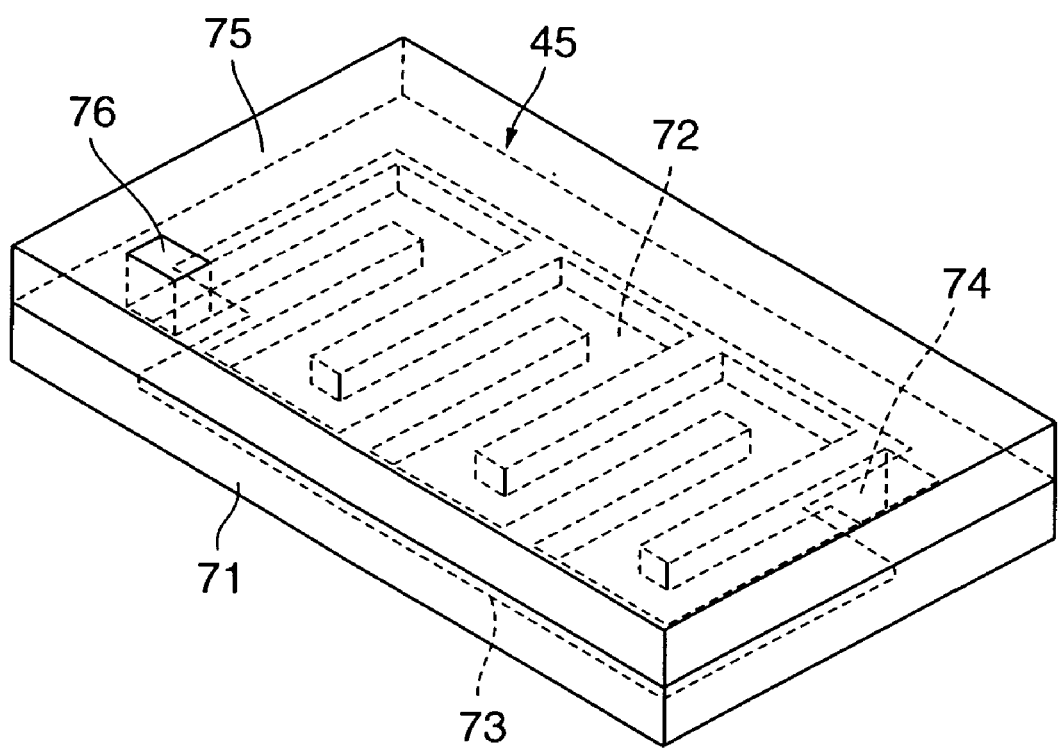
FIG. 11 is a perspective view of part of a fuel reforming portion.

A practical structure of the fuel reforming portion 45 will be described below with reference to FIG. 11. This fuel reforming portion 45 has a structure in which a zigzagged flow path 72 is formed in one surface of a substrate 71 made of, e.g., silicon, glass, or an aluminum alloy, a catalyst (not shown) such as $Cu/ZnO/Al_2O_3$ is adhered to the inner wall surface of the flow path 72, a thin film heater 73 and heater wiring (not shown) are formed on the other surface of the substrate 71, and the flow path 72 in the surface of the substrate 71 is covered with a glass plate 75. An inlet 74 is formed in that portion of the substrate 71, which corresponds to one end portion of the flow path 72. An outlet 76 is formed in that portion of the glass plate 75, which corresponds to the other end portion of the flow path 72.

Figure 12:
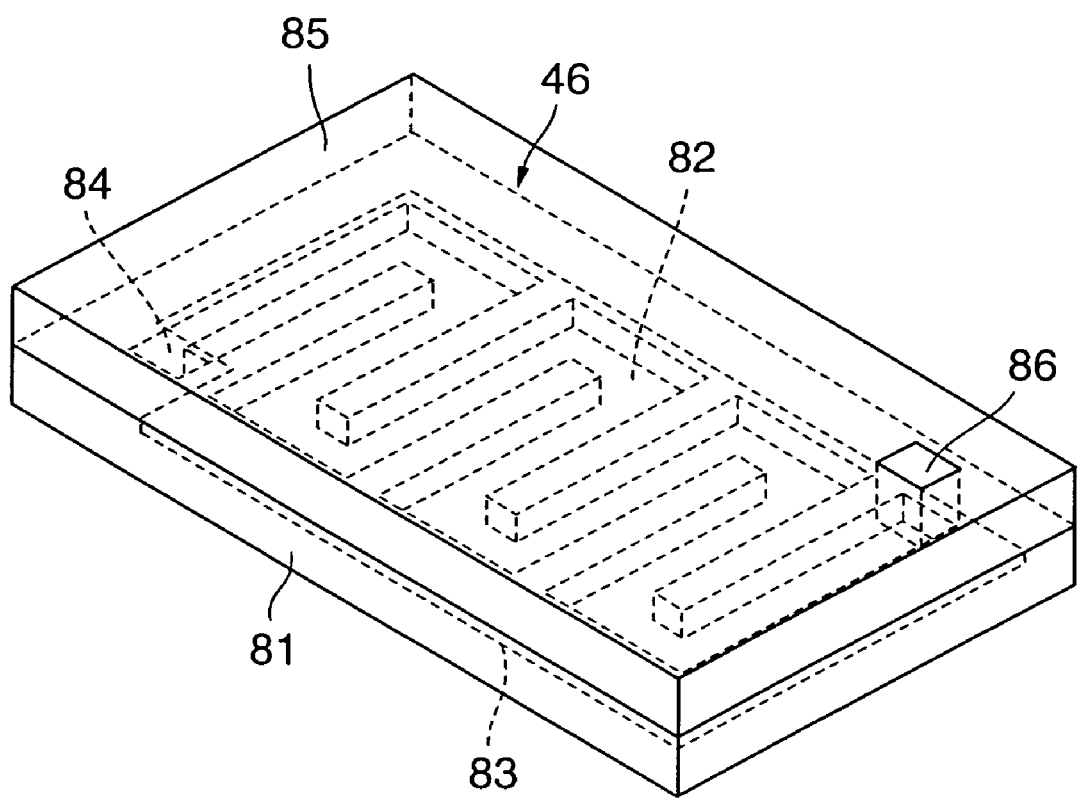
FIG. 12 is a perspective view of part of a CO elimination portion.

A practical structure of the CO elimination portion 46 will be described below with reference to FIG. 12. This CO elimination portion 46 has a structure in which a zigzagged flow path 82 is formed in one surface of a substrate 81 made of, e.g., silicon, glass, or an aluminum alloy, a catalyst (not shown) such as $Pt/Al_2O_3$ is adhered to the inner wall surface of the flow path 82, a thin film heater 83 and heater wiring (not shown) are formed on the other surface of the substrate 81, and the flow path 82 in the surface of the substrate 81 is covered with a glass plate 85. An inlet 84 is formed in that portion of the substrate 81, which corresponds to one end portion of the flow path 82. An outlet 86 is formed in that portion of the glass plate 85, which corresponds to the other end portion of the flow path 82.

In accordance with the command signal from the control portion 55, the temperature control portion 56 supplies predetermined electric power to the thin film heater 63 of the fuel vapor portion 44, thereby heating the heater 63. A predetermined amount of fuel (an aqueous methanol solution) in a liquid state supplied from the fuel pack portion 27 to the fuel vapor portion 44 in accordance with the command signal from the control portion 55 is supplied to the inlet 64 of this fuel vapor portion 44. The thin film heater 63 generates heat (about 120° C.) and vaporizes the aqueous methanol solution supplied into the flow path 62. The vaporized fluid moves from the inlet 64 to the outlet 68 under the internal pressure of the flow path 62, and reaches the inlet 74 of the fuel reforming portion 45.

In the fuel reforming portion 45, the thin film heater 73 is heated to an appropriate temperature (about 200° C. to 300° C.) in accordance with the command signal from the control portion 55. In the flow path 72, the methanol and water reaching the outlet 76 of the fuel reforming portion 45 cause an endothermic reaction as indicated by $$CH_3OH+H_2O \rightarrow 3H_2+CO_2 \qquad (1)$$

by heating by the thin film heater 73, thereby producing hydrogen and carbon dioxide as a byproduct. In this reaction, a slight amount of carbon monoxide is also produced.

Water ($H_2O$) on the left-hand side of formula (1) above can be water contained in the fuel in the fuel pack portion 27 of the fuel pack 21 in the initial stages of the reaction. However, water produced by power generation by the power generation portion 50 can be collected and supplied to the fuel reforming portion 45. The reaction amount of formula (1) per unit volume in the fuel pack portion 27 is increased by raising the packing ratio of hydrogen-containing liquid fuel such as methanol, liquefied fuel, or gaseous fuel, of the fuel packed in the fuel pack portion 27. This allows the electric power to be supplied for longer periods. The supply source of water on the left-hand side of formula (1) during power generation by the power generation portion 50 can be the power generation portion 50 and fuel pack portion 27, or the fuel pack portion 27 alone. Alternatively, it is possible to use water in this fuel pack portion 27 in the initial stages of the reaction, and, when water is produced in the power generation portion 50, switch to the water in this power generation portion 50. Note that carbon monoxide is sometimes produced in the fuel reforming portion 45 although the amount is very small.

The produced hydrogen, carbon dioxide as a byproduct, and carbon monoxide move in a vaporized state from the outlet 74 to the inlet 84 of the CO elimination portion 46. Since the temperature control portion 56 supplies predetermined electric power to the thin film heater 83 in accordance with the command signal from the control portion 55, this thin film heater 83 generates heat (about 120° C. to 220° C.). As a consequence, of the hydrogen, carbon monoxide, and water supplied into the flow path 82, the carbon monoxide and water react to cause an aqueous shift reaction which produces hydrogen and carbon dioxide as a byproduct, as indicated by $$CO + H_2O \rightarrow H_2 + CO_2 \quad (2)$$

Water ($H_2O$) on the left-hand side of formula (2) above can be water contained in the fuel in the fuel pack portion 27 of the fuel pack 21 in the initial stages of the reaction. However, water produced by power generation by the power generation portion 50 can be collected and supplied to the fuel reforming portion 45. The supply source of water on the left-hand side of formula (2) during power generation by the power generation portion 50 can be the power generation portion 50 and fuel pack portion 27, or the fuel pack portion 27 alone. Alternatively, it is possible to use water in the fuel pack portion 27 in the initial stages of the reaction, and, when water is produced in the power generation portion 50, switch to the water in this power generation portion 50.

Most of the fluid finally reaching the outlet 84 of the CO elimination portion 46 are hydrogen and carbon dioxide. If a very slight amount of carbon monoxide is contained in the fluid reaching the outlet 84, this residual carbon monoxide can be brought into contact with oxygen supplied from the slits 11 via the check valve, thereby causing a selective oxidation reaction which produces carbon dioxide as indicated by $$CO + (1/2)O_2 \rightarrow CO_2 \quad (3)$$

As a consequence, the carbon monoxide is reliably eliminated.

The products after the series of reactions described above are hydrogen and carbon dioxide (containing a slight amount of water in some cases). Of these products, the carbon dioxide is separated from the water and discharged to the atmosphere from the slits 11.

Accordingly, only hydrogen from the CO elimination portion 46 is supplied to the power generation portion 50. This hydrogen from the CO elimination portion 46 is supplied to the power generation portion 50 by the micro pump 48 which operates by receiving the supply of electric power from the sub charge portion 54, in accordance with the command signal from the control portion 55.

Figure 13:
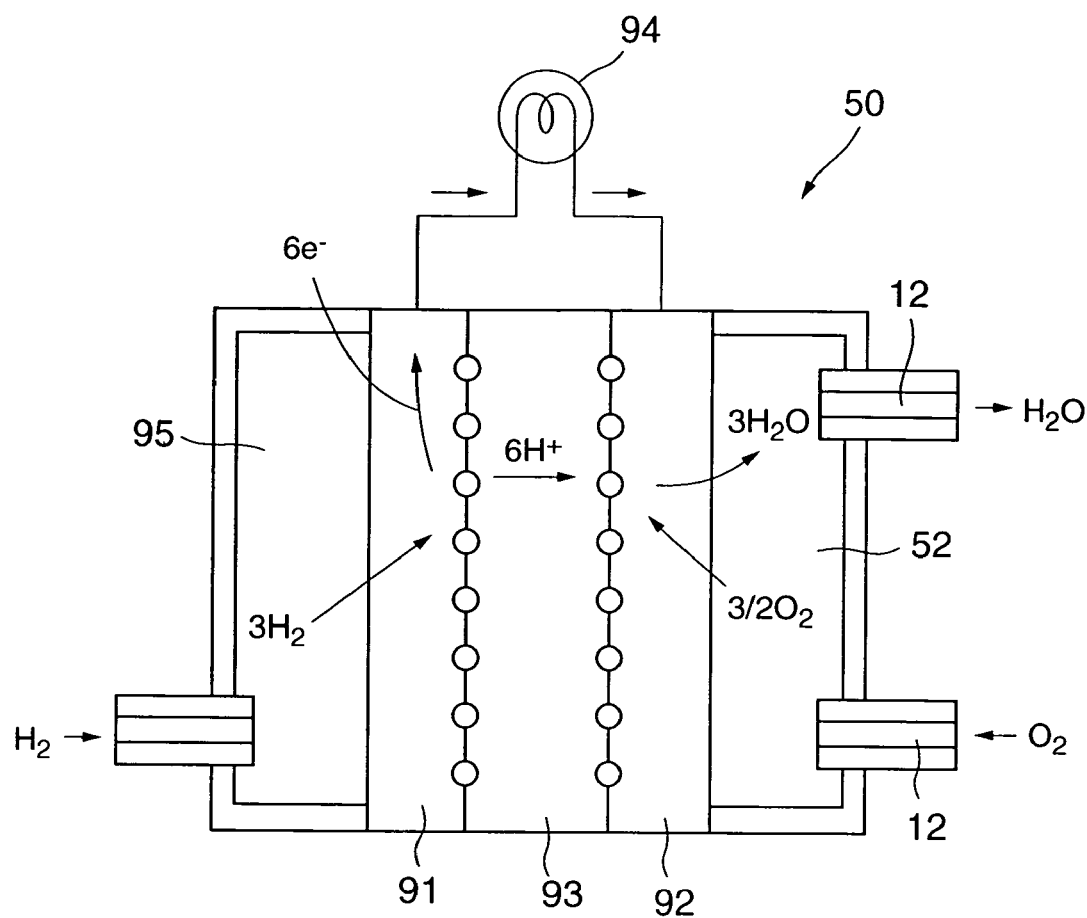
FIG. 13 is a schematic view of a power generation portion.

A practical structure of the power generation portion 50 will be described below with reference to FIG. 13. This power generation portion 50 is a well-known polymer electrolyte fuel cell. That is, the power generation portion 50 includes a cathode 91 formed of a carbon electrode to which a catalyst such as Pt/C is adhered, an anode 92 formed of a carbon electrode to which a catalyst such as Pt/Ru/C is adhered, and an ion conductive film 93 interposed between these cathode 91 and anode 92. The power generation portion 50 supplies electric power to a load 94 provided between the cathode 91 and anode 92. This load 94 can also be the charge portion 51 or the load 103 of the device 101 shown in FIG. 8.

In this structure, a space 95 is formed outside the cathode 91. Into this space 95, hydrogen ($H_2$) from the CD elimination portion 46 is supplied. Also, a space or flow path 52 is formed outside the anode 92. Into this flow path 52, oxygen ($O_2$) is supplied from the slits 12.

On the side of the cathode 91, electrons ($e^-$) are separated from hydrogen to generate hydrogen ions (protons; $H^+$), these hydrogen ions reach the anode 92 through the ion conductive film 93, and the cathode 91 extracts and supplies electrons ($e^-$) to the load 94, as indicated by $$3H_2 \rightarrow 6H^+ + 6e^- \quad (4)$$

On the side of the anode 92, the electrons ($e^-$) supplied via the load 94, the hydrogen ions ($H^+$) passing through the ion conductive film 63, and oxygen react with each other to produce water as a byproduct, as indicated by $$6H^+ + (3/2)O_2 + 6e^- \rightarrow 3H_2O \quad (5)$$

The series of electrochemical reactions (formulas (4) and (5)) as described above progress in an environment at a relatively low temperature of about room temperature to about 80° C. A byproduct other than electric power is basically water alone. As indicated by formulas (4) and (5) above, the electric power (voltage/electric current) directly or indirectly supplied to the load 94 by the electrochemical reactions as described above depends upon the amount of hydrogen supplied to the cathode 91 of the power generation portion 50.

The control portion 55, therefore, drives the micro pump 42 so as to supply, to the power generation portion 50, fuel which produces hydrogen in an amount necessary to generate and output predetermined electric power. Note that the temperature control portion 56 can also set the power generation portion 50 at a predetermined temperature in order to promote the reactions of formulas (4) and (5).

The electric power generated by the power generation portion 50 is supplied to the charge portion 51 in the power generation module 1, thereby charging the charge portion 51. The charged power may be supplied to the load 103 and controller 102 of the device 101 as needed. The electric power generated by the power generation portion 50 may also be directly supplied to the load 103 and controller 102 of the device 101.

In accordance with the command signal from the control portion 55, water as a byproduct produced by the power generation portion 50 is collected in the byproduct collecting bag 28 of the fuel pack 21 by the micro pump 53 which operates by receiving the supply of power from the sub charge portion 54. When at least a portion of the water produced by the power generation portion 50 is supplied to the fuel reforming portion 45, the amount of water initially packed in the fuel pack portion 27 of the fuel pack 21 can be reduced. Also, the amount of water collected in the byproduct collecting bag 28 can be reduced.

Figure 14:
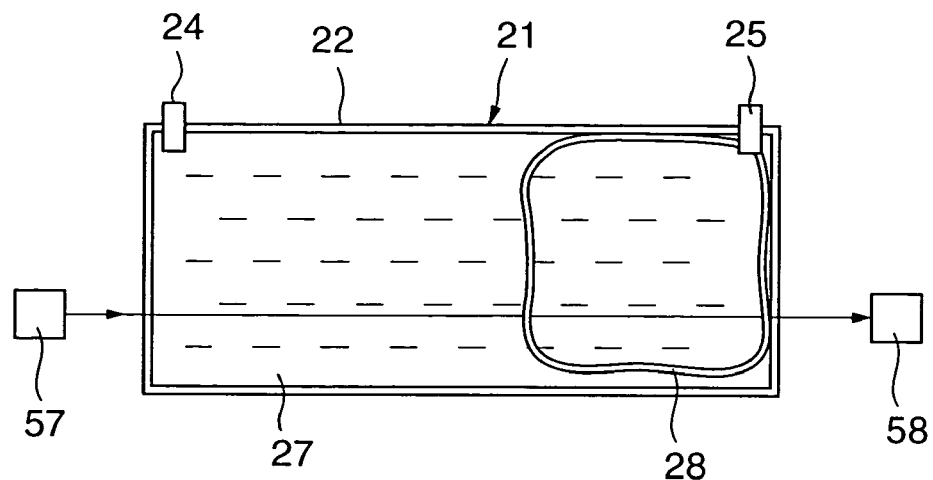
FIG. 14 is a cross-sectional view for explaining an example of detection of the remaining amount of fuel is in the fuel pack.

When the power generating operation described above is performed to a certain degree, as shown in FIG. 14, the volume of the fuel pack portion 27 decreases in accordance with the amount of fuel consumed in the power generating operation. Accordingly, the amount of water collected in the byproduct collecting bag 28 of the fuel pack 21 increases. This increases the volume of the byproduct collecting bag 28.

During the power generating operation, the control portion 55 constantly monitors the remaining amount of fuel in the fuel pack portion 27. This remaining fuel amount monitoring will be explained next. As indicated by the arrows in FIG. 14, light emitted from the emission portion 57 enters the light sense portion 58 through the transparent case 22 and the byproduct collecting bag 28.

In this byproduct collecting bag 28, a certain amount of red dye is packed beforehand. Therefore, as the amount of water collected in this byproduct collecting bag 28 increases, the dye concentration decreases, and this raises the light transmittance of the dye-containing water in the byproduct collecting bag 28.

During the power generating operation, therefore, the control portion 55 constantly receives a sense signal corresponding to the amount of light received by the light sense portion 58, and checks whether remaining fuel amount data corresponding to the sense signal is less than preset remaining fuel amount data. Referring to FIG. 14, the volume of the fuel pack portion 27 is larger than half of the volume of the case 22, so fuel in an amount necessary for power generation remains in the fuel pack portion 27.

In this case, therefore, on the basis of the sense signal from the light sense portion 58, the control portion 55 determines that fuel in an amount necessary for power generation remains in the fuel pack portion 27 of the fuel pack 21 on the right-hand side of FIG. 1. Accordingly, the control portion 55 allows the right indicating lamp 10 to keep emitting green light, allows the electromagnetic solenoid 38 to keep locking the fuel pack locking slider 9, and continues remaining fuel amount monitoring. Note that the two indicating lamps 10 emit green light from the beginning as a result of initial remaining fuel amount monitoring by the control portion 55.

Figure 15:
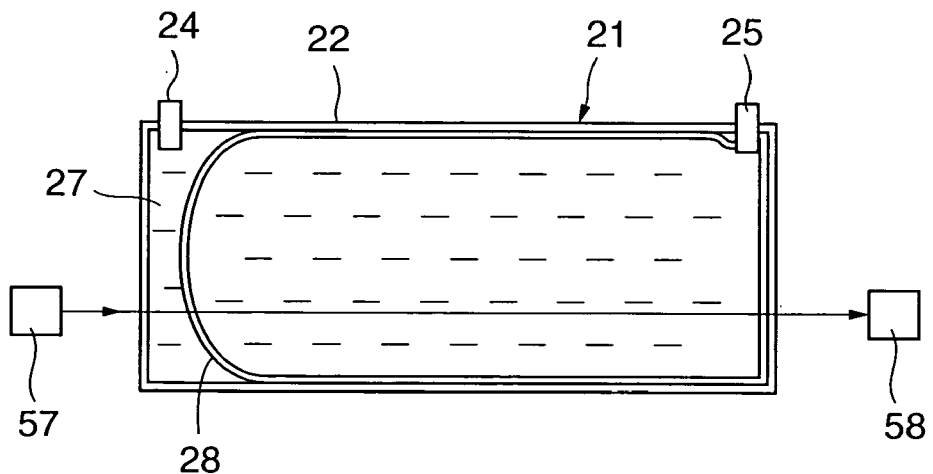
FIG. 15 is a cross-sectional view for explaining another example of the detection of the remaining amount of fuel in the fuel pack.

As shown in FIG. 15, when the power generating operation described above continues to considerably decrease the volume of the fuel pack portion 27 and so no fuel in an amount necessary for power generation remains in the fuel pack portion 27 any longer, the amount of water collected in the byproduct collecting bag 28 considerably increases, and the dye concentration fairly decreases. This considerably raises the light transmittance of the dye-containing water in the byproduct collecting bag 28.

Accordingly, on the basis of the sense signal from the light sense portion 58, the control portion 55 determines that no fuel in an amount necessary for power generation remains in the fuel pack portion 27 of the fuel pack 21 on the right-hand side of FIG. 1. The control portion 55 performs fuel supply switching (to be described later), switches light indication by the right indicating lamp 10 to red light to prompt the user to replace the right fuel pack 21, and stops power supply to the right electromagnetic solenoid 38.

When power supply to this right electromagnetic solenoid 38 is stopped, the distal end portion of the rod 39 disengages from the engaging hole 34 of the right fuel pack locking slider 9, thereby unlocking this right fuel pack locking slider 9. Therefore, the user who is prompted to replace the right fuel pack 21 by the red light indicated by the right indicating lamp 10 can replace this right fuel pack 21 with a new fuel pack by, e.g., operating the right fuel pack locking slider 9.

When the right fuel pack 21 is thus replaced with a new fuel pack or a fuel pack in which the remaining fuel amount is equal to or larger than the set remaining fuel amount data, this fuel pack is locked by the right fuel pack locking slider 9 in the same manner as described above. After confirming that the remaining fuel amount is equal to or larger than the set remaining fuel amount, the control portion 55 locks the right fuel pack locking slider 9 by the electro-magnetic solenoid 38. The right indicating lamp 10 emits green light.

Even if the user tries to replace the left fuel pack locking slider 9 by mistake when the right fuel pack 21 is to be replaced as described above, this left fuel pack locking slider 9 is locked by the dedicated electromagnetic solenoid 38 and hence is not removed by mistake.

Fuel supply switching will be described below. If, on the basis of the sense signal from the light sense portion 58, the control portion 55 determines that no fuel in an amount necessary for power generation remains in the fuel pack portion 27 of one fuel pack 21 shown in FIG. 1, the control portion 55 outputs a command signal to the sub charge portion 54 to supply electric power only to the micro pump 42 of the other fuel pack 21. Also, the control portion 55 outputs a driving control signal to the micro pump 42 of the other fuel pack 21.

Consequently, the micro pump 42 of the other fuel pack 21 starts operating to supply to the fuel vapor portion 44 fuel made of an aqueous methanol solution in the fuel pack portion 27 of the other fuel pack 21. In this manner, when no sufficient amount of fuel remains in one fuel pack 21 any longer, fuel is automatically supplied from the other fuel pack 21. This allows the device 101 to be continuously used without replacing the former fuel pack 21 with a new one.

When at least the charge portion 51 is well charged by the power generating operation described above, the control portion 55 receives from the charge portion 51 a signal indicating that this charge portion is well charged, regardless of whether the electric power is supplied to the load 103 of the device 101. On the basis of this signal, the control portion 55 stops the above power generating operation. On the other hand, if, while the power generating operation is stopped, the charged electric power is supplied from the charge portion 51 to the load 103 of the device 101 and controller 102 of the device 101. The charge amount of the charge portion 51 becomes smaller than a certain value, the control portion 55 receives from the charge portion 51 a signal indicating that the charge amount is smaller than the certain value, regardless of whether the electric power is supplied to the load 103 of the device 101. On the basis of this signal, the control portion 55 restarts the power generating operation.

When stopping the power generating operation, the control portion 55 stops power supply to the two electromagnetic solenoids 38 and makes the two fuel pack locking sliders 9 operable. Therefore, the two fuel packs 21 can be removed while the power generating operation is stopped. Since the case 22 of the fuel pack 21 is transparent, the remaining amount of fuel in the fuel pack portion 27 of the removed fuel pack 21 can be visually checked.

If the two fuel packs 21 are removed and these removed fuel packs 21 are loaded in the fuel pack accommodating portions 5 different from the original ones by mistake, one fuel pack 21 is used and is not full of fuel, and the other fuel pack 21 is not used and is full of fuel. In a case like this, the remaining fuel amounts in the two fuel packs 21 are detected, and the control portion 55 selects a fuel pack 21 having a smaller remaining amount and generates power by using fuel supplied from this fuel pack 21 having a smaller remaining amount. If determining that both the two fuel packs 21 are brand-new and they contain equal amounts of fuel, the control portion 55 selects a predetermined one, e.g., the right fuel pack 21, and generates power by using fuel supplied from this right fuel pack 21.

Fuel applied to a fuel reforming type fuel cell currently being researched and developed is fuel with which the power generation portion 50 can generate electric energy at a relatively high energy conversion efficiency. Examples are alcohol-based liquid fuel such as methanol, ethanol and butanol, hydrogen-containing liquid fuel which is vaporized at room temperature and atmospheric pressure, e.g., liquefied gases such as dimethyl ether, isobutane, and natural gas (CNG), and gaseous fuel such as hydrogen gas. These fluid materials can be preferably used.

The present invention is not limited to the aforementioned evaporation and reforming reactions of an aqueous methanol solution. That is, any chemical reaction (endothermic reaction) which occurs at least under predetermined heating conditions can be preferably applied. In addition, an application is not restricted to the fuel cell described above, provided that electric power can be generated by using a predetermined fluid material produced by a chemical reaction as power generation fuel.

Accordingly, power generators having various forms can be used. Examples are power generation (thermal-difference electric power generation) using thermal energy generated by combustion of a fluid material produced by a chemical reaction, power generation (by internal and external combustion engines such as a gas combustion turbine, rotary engine, and Stirling engine) which uses, e.g., dynamic energy conversion by which electric power is generated by rotating a generator by using pressure energy generated by combustion, and power generation (e.g., magneto-hydrodynamics and thermoacoustic effect power generation) by which the fluid energy or thermal energy of power generation fuel is converted into electric power by using, e.g., the principle of electromagnetic induction.

When liquefied hydrogen or hydrogen gas is directly used as fuel, this fuel can be directly supplied to the power generation portion 50 by omitting the fuel vapor portion 44, fuel reforming portion 45, and CO elimination portion 46.

This permits the power generation module 1 to be incorporated into the notebook personal computer 101. FIG. 16A is a side view showing, from the side of the power generation type portable power supply, the notebook personal computer 101 into which this power generation type portable power supply is inserted. FIG. 16B is a front view of the notebook personal computer 101 into which the power generation type power supply is inserted when viewed from the top. FIG. 16C is a side view of the notebook personal computer 101 into which the power generation type power supply is inserted when viewed from the side.

The notebook personal computer 101 has a main body 97 containing a motherboard and the like, and provided with a keyboard on its upper surface, battery support portions 98 positioned at the back of the main body 97, a display panel 99 such as a liquid crystal display, and panel support portions 100 which allow the display panel 99 to freely pivot with respect to the main body 97. The power generation module 1 has grooves 96 in its two end portions, so that these grooves 96 are fitted on guide projections 104 formed on the battery support portions 98 of the notebook personal computer 101.

Figure 17:
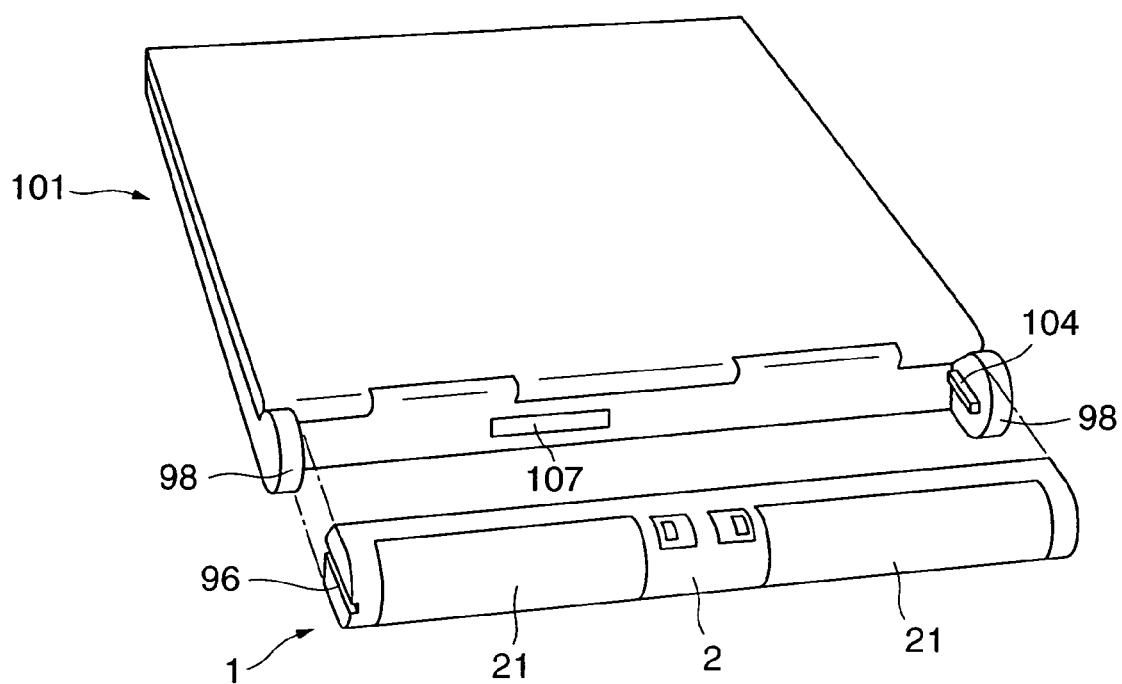
FIG. 17 is a perspective view showing the external appearances of the power generation type portable power supply and notebook personal computer according to the present invention.

As shown in FIG. 17, the grooves 96 at the both ends of the power generation module 1 are fitted on the guide projections 104 formed inside the two battery support portions 98 of the notebook personal computer 101. The power generation module 1 functions as a power generation type portable power supply when it is slid until the positive electrode terminal 6 and negative electrode terminal 7 of this power generation module 1 are inserted into a connector 107 of the notebook personal computer 101.

This power generation type portable power supply may also be automatically locked so as not to be removed from the notebook personal computer 101, if electrical driving other than the internal battery is required except when the notebook personal computer 101 is driven by the internal battery in a standby state.

Another power generation type portable power supply can be incorporated into the notebook personal computer 101. FIG. 18A is a side view showing, from the side of the power generation type portable power supply, the notebook personal computer 101 into which this power generation type portable power supply is inserted. FIG. 18B is a front view of the notebook personal computer 101 into which the power generation type power supply is inserted when viewed from the top. FIG. 18C is a side view of the notebook personal computer 101 into which the power generation type power supply is inserted when viewed from the side.

A case 106 of the fuel pack 21 of the power generation type portable power supply of this embodiment is the same as the case 22 of the above embodiment, except that the case 106 is made of a biodegradable polymer which naturally decomposes by decomposing factors such as bacteria, and that this case 106 has a size smaller than the fuel pack accommodating portion 5.

In addition, a protection case 105 is formed to prevent a leak of fuel by preventing decomposition of the case 106 by some external cause while the case 106 is in use after being accommodated in the fuel pack accommodating portion 5. This protection case 105 is made of a material other than a biodegradable polymer, and is fitted on the power generation module 1 so as to seal the case 106. When this protection case 105 is transparent, whether the fuel pack 21 (case 106) is set can be easily checked with the protection case attached to the power generation module 1.

Since the case 106 is made of a biodegradable polymer, the influence (load) on the environment can be reduced even if the used case 106 is thrown away onto soil. This solves the environmental problem caused by throwing away or burying existing chemical batteries.

The case 106 of the fuel pack 21 is made of a polymer resin. Therefore, to protect the circumferential surface of an unused case 106 from decomposing factors such as bacteria, the case 106 is desirably covered with a package made of a material other than a biodegradable polymer, and put on the market in this state. When the fuel pack 21 is to be attached, the package is peeled from the fuel pack 21.

In the power generation module 1 of each embodiment described above, a plurality of fuel packs loaded or accommodated in the two fuel pack accommodating portions (accommodating section) 5 can be independently removed. Even when power generation fuel is packed in an amount necessary for power generation in only one of the accommodated fuel packs, the micro pump 42 is so operated that the power generation module 1 selectively receives the power generation fuel from this fuel pack. The micro pump 42 corresponding to a fuel pack containing no power generation fuel in an amount necessary for power generation does not operate to supply the power generation fuel. Therefore, this fuel pack can be readily removed and replaced with a fuel pack in which power generation fuel is packed in an amount necessary for power generation.

Even when one fuel pack is accommodated in one of a plurality of fuel pack accommodating portions 5 of the power generation module 1 of each embodiment, if the accommodated fuel pack has an amount necessary for power generation, the power generation module can generate power by selectively receiving power generation fuel from this fuel pack.

If two fuel packs are loaded in the fuel pack accommodating portions 5 and power generation fuel in an amount necessary for power generation is packed in each of these accommodated fuel packs, the power generation module 1 of each embodiment compares the amounts of power generation fuel in the two accommodated fuel packs. The power generation module 1 selectively operates the micro pump 42 such that the power generation fuel is supplied to the power generation module only from a fuel pack having smaller amounts.

Also, the fuel pack accommodating portions of the power generation module 1 of each embodiment can accommodate the fuel packs having the same structure. Since only one type of fuel pack need be used, the user need only remember the same way of mounting whenever he or she sets a fuel pack in the fuel accommodating portion 5. This makes the operation simple.

Furthermore, while at least one of the fuel packs accommodated in a plurality of fuel pack accommodating portions 5 is supplying power generation fuel to the power generation module, the control portion locks this fuel pack so as not to be removed from the power generation module, and keeps a fuel pack unlocked from which no power generation fuel is supplied, thereby making a safe structure in which a normal power generating operation takes place. If none of a plurality of fuel packs is supplying power generation fuel to the power generation module 1, all these fuel packs are unlocked and hence can be easily removed.

With this arrangement, while a first fuel pack is supplying power generation fuel to the power generation module 1 with this first fuel pack and a second fuel pack being loaded in the fuel pack accommodating portions 5, the amount of power generation fuel remaining in the first fuel pack is detected. If, on the basis of this remaining fuel amount detection signal, the control portion determines that no power generation fuel in an amount necessary for power generation remains in the first fuel pack, the control portion switches the supply of the power generation fuel to the power generation portion from the first fuel pack to the second fuel pack. During this fuel pack supply switching, the control portion unlocks the locked first fuel pack and locks the unlocked second fuel pack.

In each embodiment, the number of fuel packs which can be loaded in the fuel pack accommodating portions 5 may be set to K (K is an integer of 2 or more), and one (inclusive) to K (inclusive) fuel packs may be simultaneously inserted and operated. Even when the number of fuel packs loaded in the fuel pack accommodating portions is 1 (inclusive) to (K−1) (inclusive), if the loaded fuel pack has an amount necessary for power generation, the power generation module may selectively receive power generation fuel from this fuel pack. Also, this power generation module may be so set as to be able to receive power generation fuel from two or more fuel packs at the same time. In each embodiment, two fuel cells as the power generation portions 50 of the power generation type portable power supply are used in accordance with the number of fuel packs. However, only one fuel cell may also be used. If three or more fuel pack accommodating portions 5 are formed, the number of fuel cells may be either the same as or different from the number of these fuel pack accommodating portions 5. When the fuel packs 21 are loaded in three or more fuel pack accommodating portions 5 of the power generation module 1, fuel may be supplied from a plurality of fuel packs 21 at the same time, provided that fuel is not supplied from all the fuel packs 21 at the same time.

In each embodiment, the power generation module 1 has two output terminals, i.e., the positive electrode terminal 6 and negative electrode terminal 7. In addition to the positive electrode terminal 6 and negative electrode terminal 7, however, it is also possible to form input/output terminals such as a temperature sensor signal input/output terminal for sensing the temperature of at least one of the fuel vapor portion, fuel reforming portion, CO elimination portion, and power generation module power generation portion, each of which uses a thin film heater, and for transmitting temperature data to the device 101, a control circuit clock line terminal for outputting a clock signal to the control portion 55, a control circuit data line terminal for exchanging necessary data between the control portion 55 and device 101, and a remaining amount data output terminal for outputting data of, e.g., the remaining amount of fuel, from the control portion 55 to the device 101.

In each embodiment, the outer shape of the longitudinal section of that portion of the fuel supply port 14 which is fitted in the fuel supply valve 24 is a circle, and the inner shape of the longitudinal section of that portion of the fuel supply valve 24 which is fitted on the fuel supply port 14 is a circle. However, these outer and inner shapes are not limited to a circle as long as the byproduct collecting valve 25 is not fitted on the fuel supply port 14 and the fuel supply valve 24 is not fitted on the byproduct collecting port 15. Similarly, in each embodiment, the outer shape of the longitudinal section of that portion of the byproduct collecting port 15 which is fitted in the byproduct collecting valve 25 is a rectangle, and the inner shape of the longitudinal section of that portion of the byproduct collecting valve 25 which is fitted on the byproduct collecting port 15 is a rectangle. However, these outer and inner shapes are not limited to a rectangle as long as the fuel supply valve 24 is not fitted on the byproduct collecting port 15 and the byproduct collecting valve 25 is not fitted on the fuel supply port 14.

The power generation type portable power supply of this embodiment can be used as a power supply of a highly portable electronic device, such as a cell phone, PDA, digital still camera, and digital video camera, as well as a notebook personal computer.

In particular, even when one fuel pack is consumed and has an insufficient amount for power generation while a user is conversing on a cell phone or shooting images with a digital video camera, this fuel pack is switched to the other fuel pack to supply power generation fuel from it. Therefore, the user can keep using the electronic device without turning it off, i.e., without once terminating the conversation or image shooting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A power supply for supplying electric power to a device, the power supply comprising a power generation module, wherein the power generation module comprises:
   a power generation portion which generates power by using supplied power generation fuel;
   a plurality of fuel pack accommodating portions which accommodate a plurality of fuel packs including at least a first fuel pack and a second fuel pack to store the power generation fuel; and
   a control portion which controls fuel supplying such that, while the power generation fuel is supplied from one of the first and second fuel packs, the power generation fuel is not supplied from the other one of the first and second fuel packs accommodated in the fuel pack accommodating portions;

wherein the control portion comprises a fuel pack locking portion which selectively locks the fuel packs in the fuel pack accommodating portions;

wherein the control portion further comprises a fuel switching portion including a detection section for detecting an amount of the power generation fuel remaining in the first and second fuel packs accommodated in the fuel pack accommodating portions, and for supplying a detecting signal corresponding to the amount of the power generation fuel in the first and second fuel packs; and wherein the control portion:
  compares the amount of the power generation fuel in the first and second fuel packs based on the detecting signal,
  controls the fuel pack locking portion to lock one of the first and second fuel packs having a lower amount of the power generation fuel which is sufficient for a power generating operation,
  controls said one of the first and second fuel packs having the lower amount of the power generation fuel sufficient for the power generating operation to supply the power generation fuel therefrom to the power generation portion,
  unlocks said other one of the first and second fuel packs,
  judges when the amount of the power generation fuel remaining in said one of the first and second fuel packs, which is supplying the power generation fuel to the power generation portion, is less than an amount necessary for the power generating operation, based on the detecting signal,
  stops the supply of the power generation fuel from said one of the first and second fuel packs and unlocks said fuel pack when it is judged that the amount of the power generation fuel therein is less than the amount necessary for the power generating operation, and
  locks said other one of the first and second fuel packs and controls said other fuel pack to supply the power generation fuel therefrom to the power generation portion.

2. A power supply according to claim 1, wherein the fuel packs accommodated by the fuel pack accommodating portions have a same structure.

3. A power supply according to claim 1, wherein after comparing the amount of the power generation fuel in the first and second fuel packs based on the detecting signal, if the control portion determines that one of the first and second fuel packs contains power generation fuel in the amount necessary for the power generating operation and said other one of the first and second fuel packs does not contain power generation fuel in the amount necessary for the power generating operation, the control portion locks said one of the first and second fuel packs containing the power generation fuel in the amount necessary for the power generating operation and controls said fuel pack to supply the power generation fuel therefrom to the power generating portion.

4. A power supply according to claim 1, wherein the fuel pack locking portion keeps the first and second fuel packs unlocked, while the first and second fuel packs are accommodated in the fuel pack accommodating portions, and when neither of the first and second fuel packs is supplying the power generation fuel to the power generation module.

5. A power supply according to claim 1, further comprising a remaining fuel amount indicating portion.

6. A power supply according to claim 5, wherein the remaining fuel amount indicating portion indicates at least whether the amount of power generation fuel in each fuel pack is sufficient for the power generating operation.

7. A power supply according to claim 1, further comprising a remaining fuel amount data output portion which outputs power generation fuel remaining amount data of each fuel pack to the device.

8. A power supply according to claim 7, wherein the remaining fuel amount data output portion outputs at least data indicating whether the amount of power generation fuel in each fuel pack is sufficient for the power generating operation.

9. A power supply according to claim 1, wherein each of the fuel packs accommodated by the fuel pack accommodating portions comprises a case made from a biodegradable polymer.

10. A power supply according to claim 1, wherein the power generation module comprises a fuel reforming portion which reforms the power generation fuel into hydrogen.

11. A power supply according to claim 1, wherein the power generation module comprises a byproduct collecting port for discharging water as a byproduct produced by the power generation module.

12. A power supply according to claim 1, wherein the power generation module comprises a charge portion which is charged by electric power generated by the power generation portion.

* * * * *

UNITED STATES PATENT AND TRADEMARK OFFICE
CERTIFICATE OF CORRECTION

PATENT NO. : 7,351,485 B2 Page 1 of 1
APPLICATION NO. : 10/474964
DATED : April 1, 2008
INVENTOR(S) : Masaharu Shioya It is certified that error appears in the above-identified patent and that said Letters Patent is hereby corrected as shown below:

On the title page:

insert item --(73) Assignee: Casio Computer Co., Ltd., Tokyo (JP)--.

Signed and Sealed this

Ninth Day of March, 2010

David J. Kappos
*Director of the United States Patent and Trademark Office*